United States Patent [19]

Hopson et al.

[11] 4,227,077
[45] Oct. 7, 1980

[54] OPTICAL TRACKING SYSTEM UTILIZING SPACED-APART DETECTOR ELEMENTS

[75] Inventors: James E. Hopson, Wellesley; Arthur B. Slater, Lexington, both of Mass.

[73] Assignee: Raytheon Company, Lexington, Mass.

[21] Appl. No.: 337,049

[22] Filed: Feb. 26, 1973

Related U.S. Application Data

[63] Continuation of Ser. No. 129,414, Mar. 30, 1971.

[51] Int. Cl.³ .......................... G01J 1/20; F41G 7/00
[52] U.S. Cl. .............................. 250/203 R; 244/3.16; 250/209; 250/342; 250/578
[58] Field of Search .................. 250/203 R, 338, 342, 250/578, 209; 244/3.16

[56] References Cited

U.S. PATENT DOCUMENTS

| | | | |
|---|---|---|---|
| 3,116,413 | 12/1963 | Fairbanks | 250/203 R |
| 3,209,150 | 9/1965 | Jung et al. | 250/352 |
| 3,258,581 | 6/1966 | Buell | 250/578 |
| 3,609,374 | 9/1971 | Gevas | 250/203 R |

*Primary Examiner*—Stephen C. Buczinski
*Attorney, Agent, or Firm*—Milton D. Bartlett; Joseph D. Pannone

[57] ABSTRACT

An optical tracking system in which an image of an object to be tracked is nutated about the image plane. Individual detector elements are arranged in a hexagonal array within the image plane such that each of the individual detector elements are located at respectively the centers of contiguous hexagonal cells. The nutation is provided, in one embodiment, by means of a tiltable mirror which rotates about an axis through the center of the mirror. The angle of tilt is variable so that the nutation can be varied to provide circular motion of an image point in circles concentric with a hexagonal cell and of varying diameter and, in particular, the image point can thereby be made to spiral inwardly toward the center of a hexagonal cell. The nutation of image points relative to the positions of the detector elements permit the various portions of an image to be scanned by individual detector elements. The inward spiraling of image points is utilized to provide for acquisition of the image points, and the position of an image point relative to a detector element at a given instant of time is utilized to provide elevation and azimuthal tracking data for tracking a desired object.

18 Claims, 14 Drawing Figures

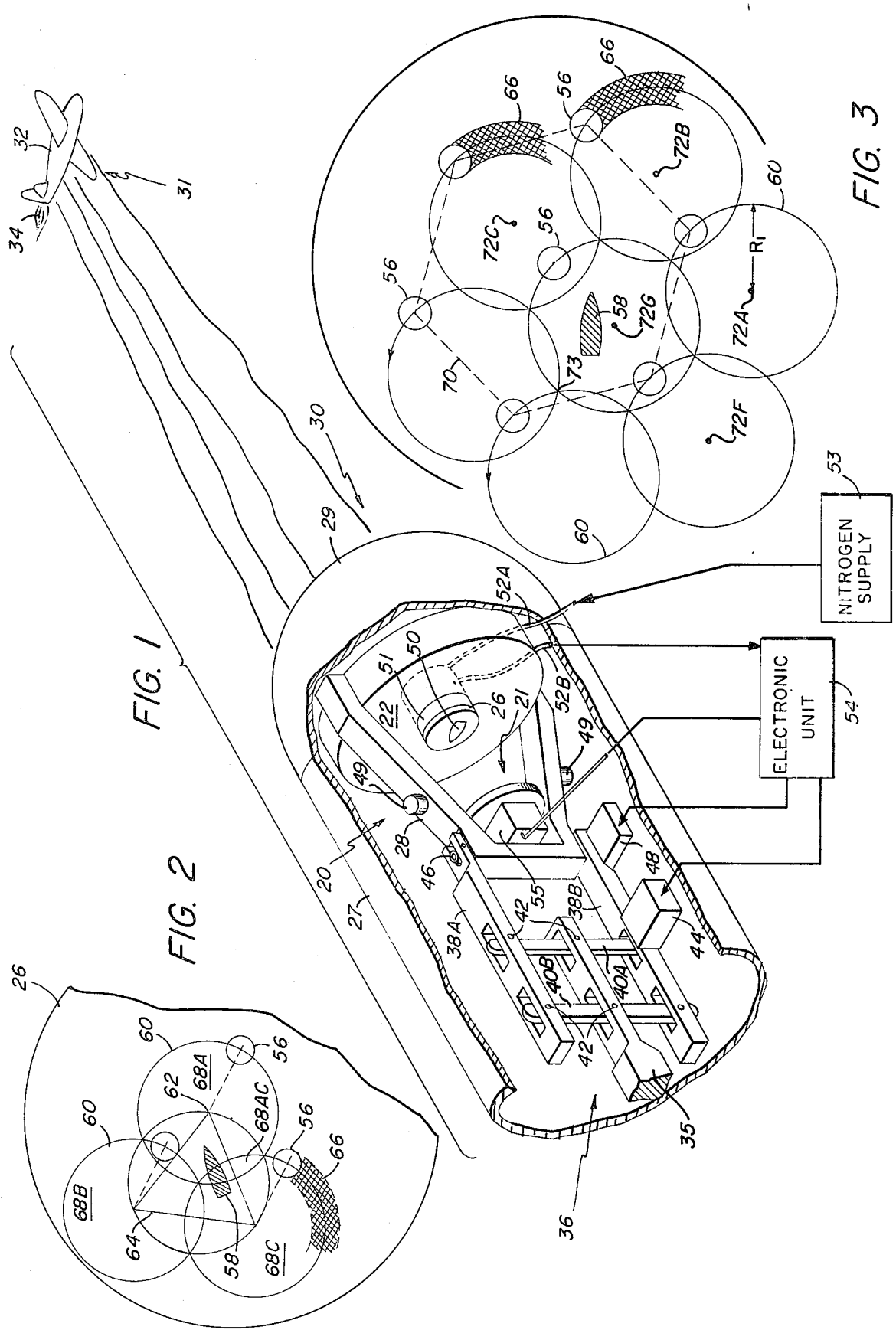

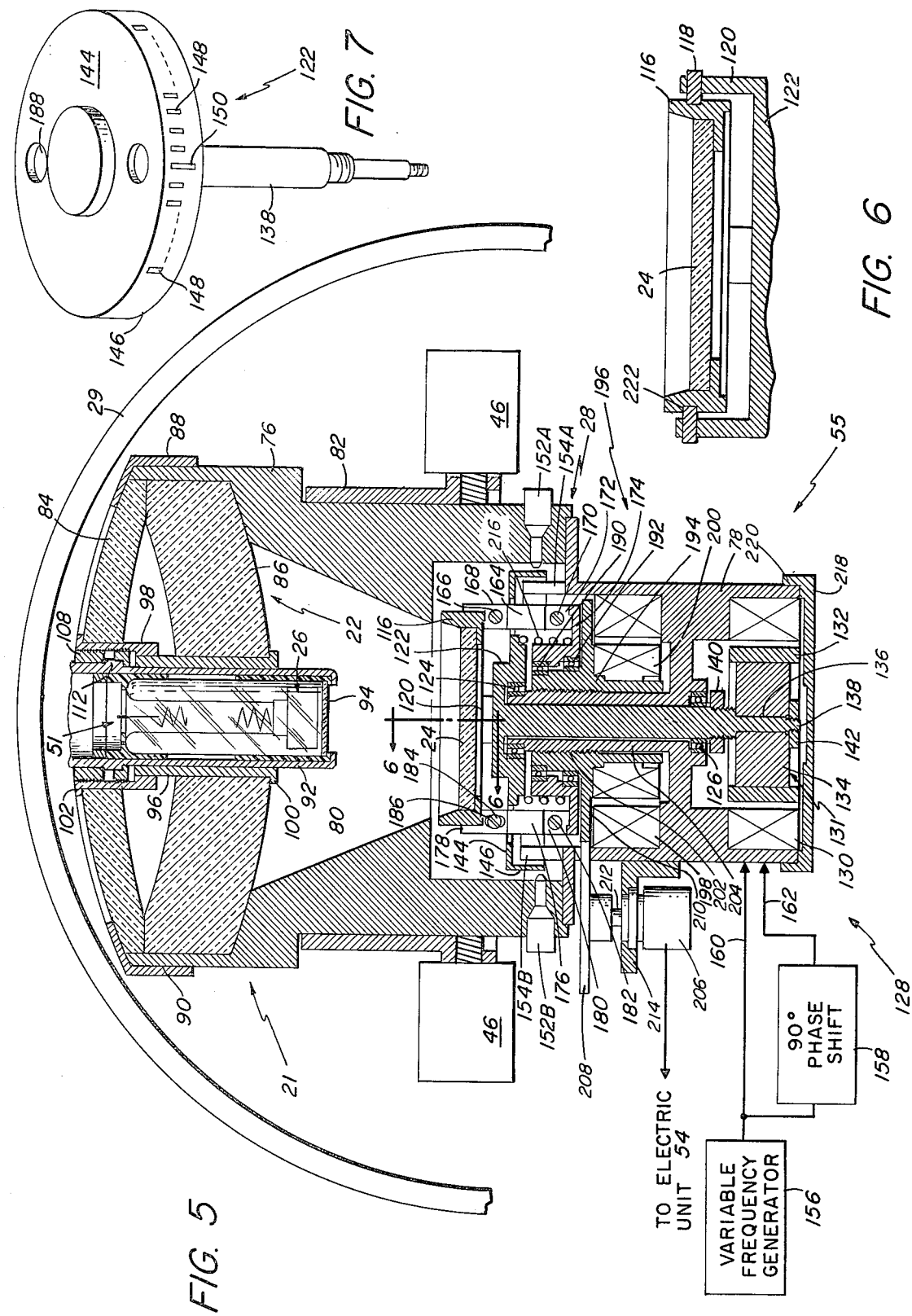

OPTICAL TRACKING SYSTEM UTILIZING SPACED-APART DETECTOR ELEMENTS

This is a continuation of application Ser. No. 129,414, filed Mar. 30, 1971.

BACKGROUND OF THE INVENTION

Optical tracking systems of the prior art particularly infrared tracking systems utilized to track moving objects have frequently utilized a single relatively large infrared detector element in conjunction with a suitable scanning device for scanning an image of the object across the infrared detector element. Tracking signals indicative of the displacement of the object from the axis of the scanning system have been developed by means of a reticle in optical alignment with the infrared detector element. The reticle modulates radiation from the object with a modulation pattern which indicates the direction of displacement of the object from the axis of the scanning system.

A problem arises in that the use of a single relatively large infrared detector introduces substantially more noise into the system than that introduced by a relatively small infrared detector element because, as is well known, the noise generated within an infrared detector element is proportional to the area of the detector element responsive to the incident radiation. The use of a multitude of relatively small infrared detector elements to counteract this problem of the single relatively large detector element may result in a far more complex scanning system in that the signals from each of the numerous detector elements must be separately received and correlated with the detector location and with the times of reception of these signals to extract information, such as the displacement of an object relative to the axis of the scanning system.

SUMMARY OF THE INVENTION

In accordance with the invention there is provided a relatively small number of physically small detector elements in an optical system for measuring the angular coordinates of the position of an object. Focusing means provide an image of the object, and a detector assembly comprising an array of individual detector elements is positioned at the image plane. Provision is made within the focusing means for translating the image within the image plane so that the image is nutated in a pattern which permits an individual detector element to scan a region of the image, by means of a spiral scan. The relative movement between detector element and image point is readily visualized by regarding the image as being stationary and the detector assembly as translating within the image plane. With this view point it is seen that a detector element moves about a point of the image in a circular or spiral path. In order to scan contiguous parts of the image with minimum overlapping, the individual detector elements are arranged within the image plane such that each detector element is positioned in the center of a hexagon, all hexagons being contiguous. For acquisition of the object, a spiral scan is utilized while for tracking of the object, a circular scan of constant radius is utilized, the position of an image point relative to the detector element indicating the angular orientation of the object relative to an axis of the scanning system.

BRIEF DESCRIPTION OF THE DRAWINGS

The aforementioned aspects and other features of the invention are explained in the following description taken in connection with the accompanying drawings wherein:

FIG. 1 shows an optical system in accordance with the invention carried by a vehicle for tracking a target;

FIG. 2 is a diagrammatic view of a simplified arrangement of the detector elements of the invention;

FIG. 3 is a diagrammatic view of an array of detector elements arranged in accordance with the preferred embodiment of the invention;

FIG. 5 shows the focusing system and a scanning mechanism, partially in section, in accordance with the invention;

FIG. 6 is a sectional view of a support for a mirror of the scanning mechanism;

FIG. 7 is a detailed view of a rotary member of the scanning mechanism;

DESCRIPTION OF THE PREFERRED EMBODIMENT

Figure 4:
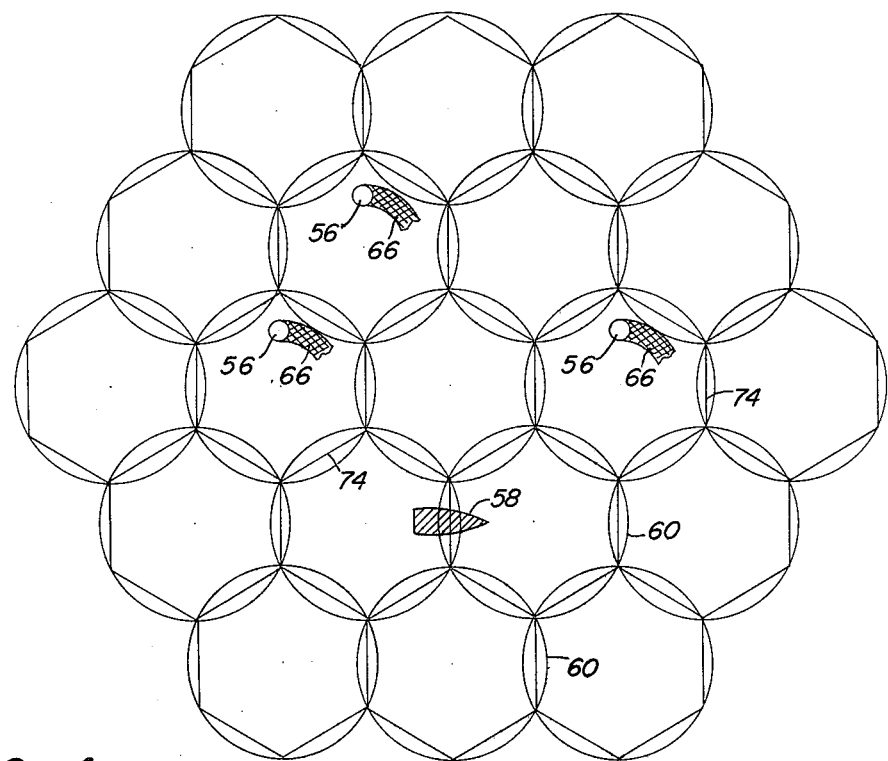
FIG. 4 is a diagrammatic view of a still further embodiment of the invention employing a greater number of detector elements.

Referring now to FIG. 1 there is shown a cutaway view, partially diagrammatic, of an optical system 20 in accordance with the invention in which a catadioptric focusing unit 21 comprising a converging lens 22, mirror 24 and detector assembly 26 is mounted within a housing 27 by means of frame 28 for pivoting about the center of a spherical dome 29 at the end of housing 27. The optical system 20 may be utilized, for example, in a theodilite, or as is shown in FIG. 1, in a missile 30 for tracking an object 31 such as a jet aircraft 32 having an exhaust plume 34 which emits both visible and infrared radiation. The dome 29 and housing 27 conveniently serve as the nose or forward portion of the missile 30, and base member 35 of tilt arm assembly 36 is rigidly attached to the airframe of the missile 30. In this way the focusing unit 21 can be pivoted relative to the base member 35 and the missile airframe for tracking the direction of an object such as object 31 relative to the orientation of the missile 30. It is understood that while a reflecting means, the mirror 24, is shown, the scanning could be accomplished by using refracting optical elements (not shown).

The tilt arm assembly 36 provides for the pivoting of the focusing unit 21 in the following manner. Tilt arm assembly 36 comprises upper arm 38A and lower arm 38B which are constrained to translate parallel to the base member 35 by means of a pair of parallel struts 40A and 40B pivotally interconnecting upper arm 38A, lower arm 38B and base member 35. The pivotal connections are accomplished by means of pins 42, and at one pivot point, by means of the shaft (not shown) of a drive unit 44 which is shown diagrammatically. The drive unit 44 is affixed to the lower arm 38B, and its shaft threads through lower arm 38B and connects with strut 40A to provide a rotation of strut 40A relative to lower arm 38B thereby inducing a translation of lower arm 38B relative to upper arm 38A. The upper arm 38A and the lower arm 38B are connected via gimbals 46 to frame 28, the gimbals 46 being positioned along a yaw axis passing through the center of the dome 29, so that the translation of upper arm 38A relative to lower arm 38B provides a tilting of the frame 28 and the focusing unit 21 about a pitch axis passing through the center of the dome 29.

The focusing unit 21 and frame 28 are privoted about the common axis of the two gimbals 46 by means of a drive unit 48 (shown diagrammatically) affixed to the gimbal 46 at the lower arm 38B, the drive unit 48 having a shaft (not shown) threading through the gimbal 46 to connect with frame 28 to impart the pivoting of frame 28 about the gimbal axis. The pivoting of frame 28 about the yaw and the pitch axes is detected by a pair of gyroscopic assemblies 49 having mutually perpendicular axes and affixed to the frame 28.

The focusing unit 21 provides an image 50 of the object 31 upon the detector assembly 26. The size of the image 50 depends on the distance of object 31 from the focusing unit 21. At a relatively long distance the image 50 is essentially a point of radiation, while at a relatively short distance the image 50 becomes extended and may cover a substantial portion of the surface of the detector assembly 26. The size and shape of the image 50 also depends on the spectral responsivity of the detector assembly 26. For example, if the detector assembly 26 were to utilize detector elements responsive to the optical spectrum, then the image 50 would comprise both the image of the jet aircraft 32 as well as the image of the exhaust plume 34. Where the detector assembly 26 utilizes detector elements responsive only to infrared radiation, the image 50 would comprise only the image of the exhaust plume 34.

The invention is particularly useful for tracking sources of infrared radiation and, therefore, the preferred embodiment will be described with reference to infrared radiation from the exhaust plume 34. The dome 29 is composed of magnesium fluoride in a form commercially available as "IRTRAN I" which is essentially transparent to infrared radiation. The dome 29 has a minor focusing effect which in combination with the focusing unit 21 produces the image 50. Since, as has been mentioned before, the dome 29 has a spherical shape and the focusing unit 21 pivots about the center of this sphere, the contribution to the focusing provided by the dome 29 is essentially invariant with the various orientations of the focusing unit 21 as the focusing unit 21 pivots relative to the housing 27.

The detector assembly 26 comprises a plurality of detector elements of indium antimonide, InSb, not shown in FIG. 1 but described hereinafter with reference to FIG. 8, which are responsive to infrared radiation. As is well known such detector elements operate in a low temperature environment such as that of liquid nitrogen, and accordingly, the detector assembly 26 is mounted at the end of a cryogenic assembly 51 having the form of a cylindrical tube. The cryogenic assembly 51 is supported at the center of the converging lens 22 in a manner to be described so that the detector assembly 26 can be positioned such that the detector elements lie within the image plane of image 50. The cryogenic assembly 51 comprises a Joule-Thompson unit to be described hereinafter in which pressurized nitrogen escapes from a small orifice thereby cooling the detector assembly 26. The nitrogen for the cryogenic assembly is conveyed via a conduit 52A from a nitrogen supply 53 shown diagrammatically. Electrical signals from the detector assembly 26 are conducted via cabling 52B to electronic unit 54 shown diagrammatically.

The tracking of the object 31 is accomplished by means of the drive units 44 and 48 which orient the focusing unit 21 in response to electrical signals provided by the electronic unit 54. The focusing unit 21 is oriented so that the image 50 of object 31 is centered upon the detector assembly 26. The electronic unit 54 is responsive to tracking error signals developed by a nutation of image 50 about the face of the detector assembly 26, the nutation being accomplished by a rotation and a tilting of mirror 24, the rotation being about an axis intersecting mirror 24 and detector assembly 26. The tilting and rotation of mirror 24 are provided by drive unit 55 which is coupled to mirror 24. Thus, electronic signals generated by detector elements of the detector assembly 26 in response to radiation of the image 50 are transmitted to the electronic unit 54 which, in turn, utilizes information provided by these electronic signals to position the focusing unit 21 such that the image 50 is centered upon the face of the detector assembly 26.

In describing the nutation of image 50 about the surface of the detector assembly 26, it is noted that the motion of an image point may be described with reference to a fixed detector element, or alternatively, the image point may be presumed to be stationary with the detector element moving about the image point. With either representation the relative motion between an image point and a detector element is the same. And, accordingly, the same tracking error signals for electronic unit 54 are developed with either of these two representations during a nutation of image 50 about the surface of detector assembly 26. The latter representation, namely the motion of a detector element about a presumably stationary image point, will be utilized in the ensuing description with reference to FIGS. 2, 3 and 4.

Referring now to FIGS. 2 and 3, there are shown embodiments of the invention having respectively three and seven detector elements 56 responsive to infrared radiation such as the radiation from the exhaust plume 34. The embodiment of FIG. 3 is the preferred embodiment while that of FIG. 2 is presented to better illustrate the principles of operation.

Referring specifically to FIG. 2, the three detector elements 56 are arranged along the front surface of the detector assembly 26 facing the mirror 24, shown in FIG. 1. The portion of the image 50 of FIG. 1 corresponding to the exhaust plume 34, is indicated by plume image 58 and is shown positioned on the surface of the detector assembly 26. The detector elements 56 and the detector assembly 26 are shown nutating about the plume image 58. Thus, each detector element 56 moves along a circular path 60 centered at a vertex 62 of equilateral triangle 64. The radius of a circular path 60 depends on the angle of tilt of mirror 24, shown in FIG. 1, and decreases with decreasing angle of tilt. Thus, for example, if the angle of tilt is slowly decreased during the nutation, a detector element 56 follows a spiral path in towards a vertex 62.

The circular paths 60 are shown in FIG. 2 are at their maximum radii corresponding to the maximum angle of tilt of the mirror 24. This maximum radius is substantially larger than the diameter of an individual detector element 56. As a detector element 56 moves around a circular path 60 it sweeps out a region 66 having a width equal to the diameter of the detector element 56. Thus, while a single detector element 56 is responsive to radiation over only a small region of the surface of the detector assembly 26 at any one instant of time, the motion of the detector element about the circular path 60 effectively increases the portion of image space, as is exemplified by the area of region 66, over which the detector element 56 is responsive to incident radiation. Furthermore, if during the nutation, the angle of tilt of mirror 24 is gradually decreased the region 66 is then seen to spiral inwardly towards a vertex 62 so that a single detector element 56 is able to cover the entire region enclosed by a circular path 60. In this way a relatively large portion of the image space on the surface of the detector assembly 26 can be monitored by detector elements which are much smaller than the area of image space being monitored. And accordingly, detector elements having a relatively small surface responsive to radiation for providing a relatively high signal to noise power level may be utilized instead of a single detector of the prior art having a relatively large surface responsive to incident radiation and therefore providing a relatively low signal to noise power level.

The circular motion of the detector element 56 results in an overlapping of the three areas 68A, 68B and 68C of the three circles. It is noted that if a hexagonal scan were utilized such that the detector element 56 moved along a hexagonal path, then there would be no overlapping areas since the hexagonal regions would mesh perfectly. However, the circular paths 60 are utilized because of the mechanical simplicity of the revolving mirror 24 which produces the circular motion. The plume image 58 is shown, by way of example, as being slightly offset from the center of the array of the three circular areas 68A, 68B and 68C. This offset position of the plume image 58 is representative of the situation near the end of a target acquisition process when the optical system 20 of FIG. 1 is utilized in acquiring and then tracking the object 31. In this offset position the plume image 58 falls within the circular area 68A and the circular area 68C as well as in the overlapping region 68AC. The plume image 58 lies outside the circular area 68B. Thus, in the situation depicted in FIG. 2, two detector elements 56 are providing data relative to the position of the plume image 58. The means whereby this data is utilized to provide tracking error signals for the electronic unit 54 will be described hereinafter with reference to FIGS. 9–14.

It is noted that the procedure for tracking an extended image, such as the plume image 58 as shown in FIG. 2, differs somewhat from the procedure for tracking a point image as occurs when the object 31 of FIG. 1 is at a long distance from the focusing unit 21. In the latter case of the point image, tracking error signals are obtained simply by noting the position of a detector element 56 at the instant when it receives radiation from the point image. And, when such a point image is positioned directly at the center of the three circular areas 68A, 68B and 68C, then all three of the detector elements 56 are providing target tracking data for improved tracking accuracy. On the other hand, where the image is extended it is preferable to utilize logic means for selecting a particular point of the image, such as the end of the plume image 58, the remainder of the tracking procedure being essentially the same as in the case of a point image.

It is also noted that the use of detector elements of relatively small size, such as the detector elements 56 provides for increased resolution over that obtainable with a single large area detector element. The maximum data rate obtainable with the embodiment of FIG. 2 is necessarily limited to the amount of time required for a detector element 56 to circulate around a circular path 60, and, if the location of the plume image 58 is not known, then the data rate is further limited by the amount of time required for a detector element 56 to spiral inwardly toward a vertex 62 thereby covering the entire area enclosed by a circular path 60.

It is also evident that for any prescribed rate of rotation of the mirror 24 of FIG. 1, a higher data rate can be obtained by using an increased number of detector elements 56, for example, such as the seven detector elements of FIG. 3, to be described hereinafter, rather than the three detector elements 56 of the embodiment of FIG. 2. The increased data rate results from the fact that with an increased number of detector elements the area to be scanned by any one detector element is smaller than the area scanned per detector element when only a few detector elements are employed. The data rate can also be increased by rotating the mirror 24 at a higher rate of rotation, but this requires an increased bandwidth for receivers, to be described hereinafter, responsive to signals from the detector element 56. And, as is well known, such increased bandwidth results in a decreased signal to noise power ratio in the receiver and a corresponding loss in sensitivity. On the other hand, increasing the number of detector elements 56 to increase the data rate results in increased system complexity in that additional data channels are required for the additional detector elements.

The data rate required to track a moving object such as the jet aircraft 32 of FIG. 1 is based on the speed at which the plume image 58 crosses the surface of the detector assembly 26, and also on the width of the region 66 swept out by a moving detector element 56. It is desirable that a detector element 56 circulate around a circular path 60 at a sufficient rate such that the plume image 58 is not displaced by a distance greater than the width of the region 66 during any one revolution of the detector element 56 about a circular path 60. This is particularly desirable when the plume image 58 is of very small physical size such as a point image. In this way the plume image 58 does not "escape" from the encirclement of a detector element 56. The displacement of the plume image 58 relative to the circular paths 60 results in the generation of tracking error signals for electronic unit 54, as will be described hereinafter, for reorienting the focusing unit 21 of FIG. 1 such that the plume image 58 is positioned at the center of the array of the circular paths 60.

Referring now to FIG. 3, there is shown an alternative embodiment of the detector assembly 26 utilizing seven detector elements 56 as compared to the three detector elements 56 shown in FIG. 2. In FIG. 3, six of the detector elements 56 are arranged in a hexagonal array about a seventh detector element 56 positioned in the center of the hexagonal array. In order to more readily visualize the hexagonal array, a hexagon 70 is shown in FIG. 3, the hexagon 70 being drawn of dashed lines and having vertices coincident with detector elements 56. In FIG. 3, as in FIG. 2, the plume image 58 is presumed to be stationary while the detector assembly 26 with the detector elements 56 is presumed to nutate through image space. Each detector element 56 circulates around a circular path 60, the circular paths 60 having centers 72A-G of which the centers 72A-F are located in a hexagonal array about the center 72A-G. If the angle of tilt of mirror 40 of FIG. 1 is slowly decreased during the nutation, the region 66 swept out by the detector elements 56 is seen to spiral inwardly respectively towards the centers 72A-G.

In the embodiment shown in FIG. 3, all seven detector elements 56 are available for acquisition of the plume image 58. Tracking of plume image 58 can commence when the focusing unit 21 of FIG. 1 has been oriented such that the plume image 58 falls within the circular path 60 centered at center 72G. Tracking of the plume image 58 may then be performed utilizing only the detector element 56 which circulates about center 72G, this tracking being done in a manner to be described similar to the well known manner of conically scanning radars. Alternatively, tracking can be accomplished by slightly offsetting the focusing unit 21 so that the plume image 58 is positioned at the intersection of three circular paths 60 such as the intersection 73, in which case the tracking is accomplished in a manner similar to that described with reference to FIG. 2.

Referring now to FIG. 4 there is shown an arrangement whereby a multiplicity of detector elements 56 may be utilized within the detector assembly 26. The arrangement comprises an array of contiguous hexagonal cells 74. A detector element is located within each hexagonal cell 74 and scans the region of image space enclosed within these cells as the mirror 40 of FIG. 1 is rotated and tilted. A hexagonal cell is utilized rather than a square cell since the hexagon is the polygon having a form most nearly approximating the circular paths of the nutating detector elements. Again, it is convenient to describe the arrangement by presuming that the plume image 58 is stationary and that the detector elements 56 are nutating in the image space. With this representation the detector elements 56 are located at the centers of their respective hexagonal cells 74 when the angle of tilt of mirror 24 is zero, and rotate on circular paths 60 which intersect the vertices of the hexagonal cells 74 when the angle of tilt of mirror 24 is at a maximum value. In FIG. 4 only a few detector elements 56 are shown in order to simplify the drawings; and the detector elements 56 are shown sweeping out regions 66 for an intermediate value of angle of tilt of mirror 24. The same tracking and acquisition procedures described earlier with reference to FIGS. 2 and 3 may be utilized for the embodiment of FIG. 4.

Referring now to FIG. 5, there is shown a detailed sectional view of the focusing unit 21 and of the drive unit 55 which tilts and rotates the mirror 24. The frame 28 which supports both the focusing unit 21 and the drive unit 55 is formed from two portions, namely, a forward housing 76 and a rear housing 78, each of which is conveniently fabricated by milling a single block of metal such as steel. The forward housing 76 supports the converging lens 22 and has an inner surface which extends inwardly toward the mirror 24 and is scrolled (not shown) to reduce internal reflections within the focusing unit 21. The forward housing 76 is rigidly connected to the rear housing 78, for example, by means of bolts (not shown), and is attached to the gimbals 46 by means of brackets 82 which are rigidly secured to the forward housing 76, by means of bolts (not shown). The rear housing 78 supports the drive unit 55. The gyroscopic assemblies 49, which are affixed to frame 28 as was shown in FIG. 1, are not shown in FIG. 5 in order to simplify the drawing.

The converging lens 22 comprises two sections, a front lens element 84 and a back lens element 86, each of which have curved surfaces substantially as shown in FIG. 5 and having a common axis which is coincident with a radius of the spherical dome 29. The front lens element 84 is composed of germanium and the back lens element 86 is composed of the same material as the dome 29, namely, the aforementioned mangesium fluoride commercially available as "IRTRAN I". The converging lens 22 is secured within the forward housing 76 by means of a cap 88 which has an interior threaded surface 90 for tightening the cap 88 against the front lens element 84.

Figure 8:
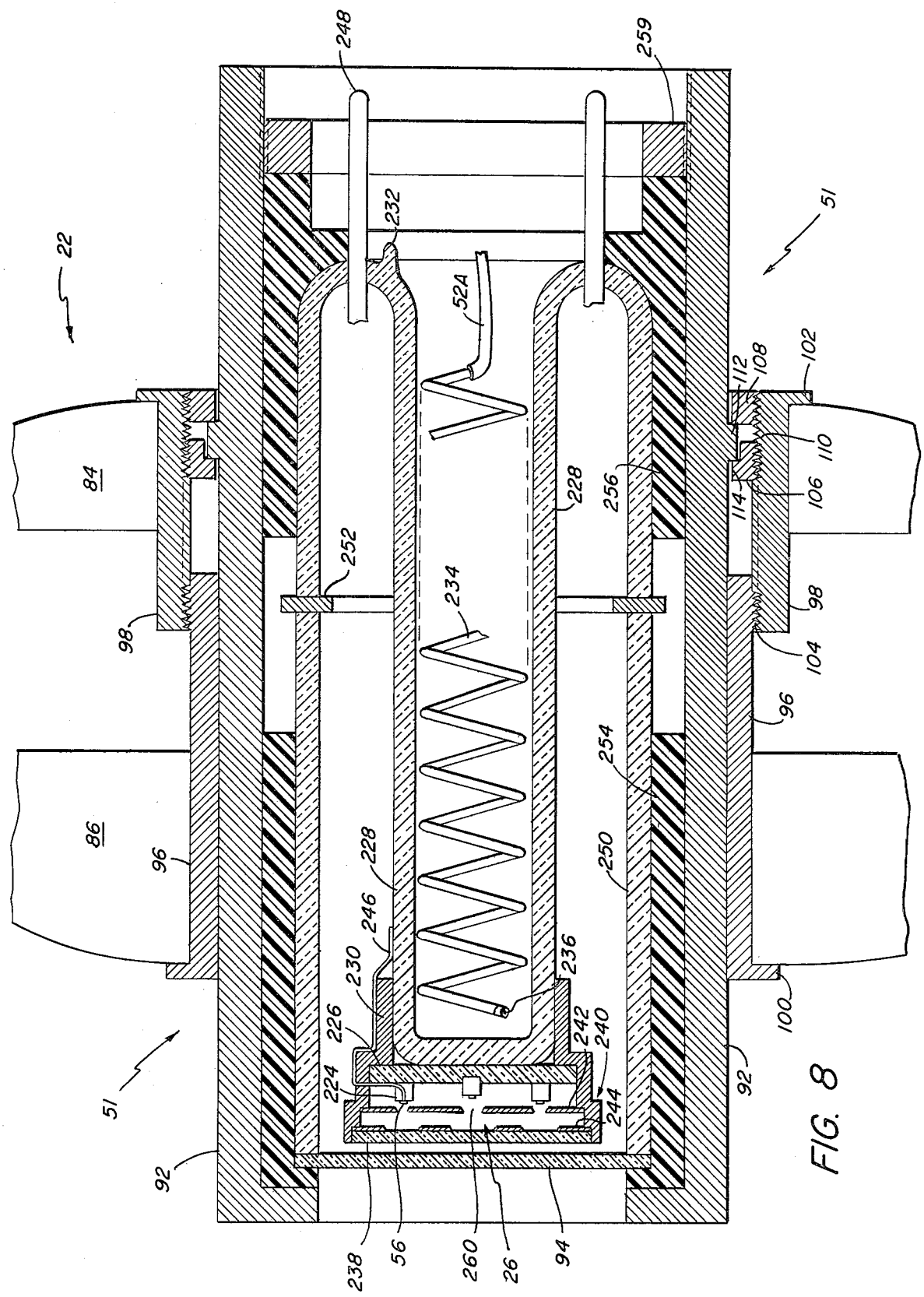
FIG. 8 is a sectional view of a cryogenic assembly for cooling and supporting a detector assembly of the invention.

The mounting of the cryogenic assembly 51 and the detector assembly 26 are shown both in FIG. 5 and in FIG. 8. The interior details of the cryogenic assembly 51 and the detector assembly 26 are not shown in FIG. 5 but will be described hereinafter with reference to FIG. 8. The cryogenic assembly 51 and the detector assembly 26 are enclosed by a stainless steel case 92 which has a window 94 at its forward end, the window 94 being composed preferably of sapphire or of silicon. The case 92 is slidably mounted within a sleeve 96 which is composed preferably of aluminum to permit positioning of the cryogenic assembly 51 and the detector assembly 26 relative to the mirror 24 for focusing the image 50 (shown in FIG. 1). The sleeve 96 together with a collar 98 support the case 92 within the center of the converging lens 22 by means of flanges 100, and 102, respectively on the sleeve 96 and the collar 98, which press against respectively the back lens element 86 and the front lens element 84. The sleeve 96 and the collar 98 mate at a threaded surface 104 and are drawn together by rotating the collar 98 relative to the sleeve 96 thereby drawing the flanges 100 and 102 towards each other to apply the aforementioned pressure to the front lens element 84 and the back lens element 86 for supporting the case 92.

The sliding of case 92 relative to the sleeve 96 is accomplished by means of bushing 106 and nut 108 which mate with collar 98 along a threaded surface 110. The collar 98, the bushing 106 and the nut 108 are all composed of aluminum. The case 92 has a bezel 112 which mates with a second bezel 114 on the bushing 106 so that the case 92 can be urged away from the mirror 24 of FIG. 1 by a rotation of the bushing 106 along the threaded surface 110. The outer diameter of the bezel 112 is greater than the inner diameter of the nut 108 so that the case 92 can be urged towards the mirror 24 by a rotation of the nut 108 along the threaded surface 110. The case 92 is constrained to remain at the correct distance from mirror 24 for the focusing of the image 50 (of FIG. 1) by tightening nut 108 against the bezel 112 of case 92 which in turn tightens the bezel 112 against the bezel 114 of bushing 106, thereby effectively locking the bushing 106 and the nut 108 to inhibit any further rotation of the bushing 106 and the nut 108 within the threaded surface 110 of the collar 98.

Referring now to FIG. 5 and FIG. 6 the mirror 24 is supported with a bezel 116 having a pair of diametrically opposed pins 118 extending outwardly thereof which permits the bezel 116 to be pivotally supported on bosses 120 which are a part of rotary member 112. Rotary member 122 is conveniently fabricated by milling a single piece of stainless steel and is supported by bearings 124 and 126 located at the termini of the central bore of the rear housing 78. Rotary member 122 is rotated by a motor 128 which is shown, by way of example, as a historesis drag type motor having a two-phase stator winding 130, shown diagrammatically, and a rotor 131 comprising a ring 132 of a readily magnetizable metallic material which is carried by a cylindrical support section 134 having a central bore 136 which mates with a reduced section of the shank 138 of the rotary member 122. The shank 138 has three successive reduced portions of diminishing diameter, the first being threaded to mate with a nut 140 for tightening the rotary member 122 against the rear housing 78 by applying pressure to the two bearings 124 and 126, the second reduced portion of the shank 138 being threaded to receive a nut 142 which tightens the cylindrical support section 134 of the rotor of motor 128 against the shank 138.

Referring now to FIGS. 5 and 7 the disc portion 144 of the rotary member 122 terminates in a flange 146 which is slotted with a series of slots 148 of uniform length and a single substantially longer slot 150 which indicate the angular orientation of the rotary member 122 as will now be described. A pair of light sources 152A and 152B, which may be lamps or photodiodes, are energized from a suitable source of electric power (not shown) and more mounted within the forward housing 76 such that light source 152A illuminates the slots 148 while the light source 152B illuminates the long slot 150. A pair of photodetectors 154A and 154B, such as for example, gallium arsenide photocells, are mounted on the rear housing 78 behind the flange 146 to receive light from respectively the light sources 152A and 152B. The photodetectors 154A and 154B respond to the light by generating electrical signals which are transmitted along conductors, not shown in FIG. 5, to the electronic unit 54. During rotation of the rotary member 122 photodetector 154A generates an electrical pulse whenever light passes from light source 152A through a slot 148 or the long slot 150. Similarly, photodetector 154B generates an electrical pulse whenever light from light source 152B passes through the long slot 150. In the preferred embodiment a total of 256 slots may be utilized of which one of these slots is the long slot 150, and the remaining 255 slots are the shorter slots 146. Thus, during rotation of the rotary member 122, the electrical signal provided by the photodetector 154B indicates that the rotary member 122 has returned to its initial position. And similarly, the electrical signals generated by photodetector 154A indicates successive increments of (360/256) degrees of rotation of the rotary member 122 relative to its initial position. The manner of utilizing the electrical signals from the photodetectors 154A and 154B in the tracking of an object such as object 31 of FIG. 1 will be described hereinafter in the description of the electronic unit 54 which begins with FIG. 9.

The motor 128 which rotates the rotary member 122 is energized by providing two phase electric power to the stator winding 130. The two phase electric power is obtained from a variable frequency generator 156 and a 90 degree phase shifter 158. Thus, if the electric current output of the variable frequency generator on line 160 is a sinusoidal function of time., then the electric current output of the 90 degree phase shifter 158 on line 162 is a cosinusoidal function of time. The application of the two phase electric power to the motor 128 results, in a well known manner, in a rotating magnetic field which imparts rotation to the rotor 131 and to the rotary member 122. The frequency of rotation of the rotary member 122 is proportional to the frequency of the electric current on line 160, and accordingly the rotation rate of the rotary member 122 may be varied by varying the frequency of the variable frequency generator 156. The variable frequency generator 156 will be further described hereinafter with reference to FIG. 9.

Referring now to FIGS. 5, 6 and 7, the mirror 24 is tilted by means of a push rod 164 which is connected by means of a pin 166 to a boss 168 on the bezel 116, and pivotably connected by means of a pin 170 to a boss 172 on a collar 174. The collar 174 is coaxial to the shank 138 and advances axially along the common axis of the shaft 138 and the collar 174, in a manner to be described, and thereby urges push rod 164 to tilt the bezel 116 and the mirror 24 about the pins 118 as shown in FIG. 6. A dummy push rod 176, boss 178 on bezel 116, and the boss 180 on collar 174 interconnect the bezel 116 and the collar 174 at a point diametrically opposite to the push rod 164 in order to counterbalance centrifugal forces developed during a rotation of the bezel 116. The boss 180 is pivotly connected to the dummy push rod 176 by means of a pin 182. The boss 178 on the bezel 116 is both pivotally and slidably connected to the dummy push rod 176 by means of a pin 184 set within an elongated slot 186, the elongated slot 186 permitting a sliding of the boss 178 relative to the dummy push rod 176 during a tilting of the bezel 116. The push rod 164 and the dummy push rod 176 pass through apertures 188 in the disc portion 144 of the rotary member 122. Collar 174 rotates at the same rotation rate as does the rotary member 122 due to the fact that the collar 174 is connected to the bezel 116 by the push rods 164 and 176.

The collar 174 is rotatably supported by bearings 190 and 192 affixed to the shaft 194 of tilt motor 196. The tilt motor 196 is a well known servomotor which is energized in a manner to be described; the electrical leads for energizing the tilt motor 196 are not shown in FIG. 5 in order to more readily explain the drive unit 55.

The tilt motor 196 comprises a stator winding 198 which is supported by the rear housing 78, and a rotor winding 200 which is supported by the shaft 194. The interface 202 between the shaft 194 and the central portion 204 of the rear housing 78 is threaded so that a rotation of the shaft 194 causes a displacement of the rotor of the tilt motor 196 in an axial direction along the central portion 204. In the preferred embodiment, a rotation of the shaft 194 of 180 degrees relative to the central portion 204 results in a displacement of 0.020 inch in the position of the shaft 194 relative to the central portion 204, this displacement being sufficient to tilt the mirror 24 approximately 5 degrees which is sufficient to provide the desired magnitude to the circular path 60 as shown in FIGS. 2 and 3. Returning to FIG. 5, the mirror 24 is thus seen to be tilted in response to an axial displacement of the rotor of tilt motor 196 because of the aforementioned interconnection of the collar 174 and the shaft 194 whereby a displacement of the shaft 194 introduces a corresponding displacement in the position of the collar 174 and the push rod 164. It is also noted that due to the bearings 190 and 192 the collar 174 can rotate at a different rate of rotation than does the shaft 194. When shaft 194 is stationary, the mirror 24 rotates at a constant angle of tilt.

The angle of tilt of mirror 24, or equivalently the displacement of shaft 194, is sensed by a potentiometer 206 connected to the shaft 194 via a gear train comprising gear 208 which meshes with gear 210, the gear 208 being affixed to the potentiometer shaft 212 and the gear 210 being rigidly connected to the shaft 194. In the preferred embodiment the gear 210 and shaft 194 are milled from a single block of metal. Adequate clearance is provided between the rotor of the tilt motor 196 and the rear housing 78 to permit the displacement of the rotor relative to the central portion 204 of the rear housing 78; and the depth of the gears 208 and 210 is sufficient to permit the displacement of gear 210 relative to gear 208 while retaining the meshing of the two gears 208 and 210.

The potentiometer 206 and the gear 208 are positioned by means of a bracket 214 affixed to the rear housing 78. To insure the there is no backlash along the threaded interface 202 during rotation of the shaft 194 a spring 216 is inserted between the disc portion 144 and the collar 174 to exert a force which tends to push apart the collar 174 and the disc portion 144. The potentiometer is excited electrically by means not shown in FIG. 5 and provides an output voltage related to the rotation of its shaft 212, the output voltage being transmitted to the electronic unit 54 as will be described hereinafter. The output voltage of the potentiometer 206 is a measure of the angle of tilt of mirror 24.

The drive unit 55 is assembled as follows: First the tilt motor 196 is assembled by placing the stator winding 198 within the rear housing 78 and affixing it therein by any suitable means such as by epoxy bonding. The collar 174 and the bearings 190 and 192 are joined to the shaft 194. The shaft 194 and the rotor winding 200 are placed in position within the rear housing 78 by rotating the shaft 194 to thread it along the threaded interface 202. The photodetectors 154A and 154B are then positioned upon the rear housing 78. The push rods 164 and 176 are connected via the pins 170 and 182 to the bosses 172 and 180. The bearing 124 is now inserted on the underside of the disc portion 144 of the rotary member 122, and then the rotary member 122 is inserted in the central bore of the central portion 204 of the rear housing 78, and the two push rods 164 and 176 are inserted through the apertures 188 in the rotary member 122. The bearing 126 is then secured by the nut 140 to the shank 138. The rotor 131 and the two-phase stator winding 130 are then positioned within the rear housing 78 and secured by the nut 142 after which the motor 128 is covered by a cap 218 which is attached to the rear housing 78 by means of a threaded flange 220. Access openings not shown in FIG. 5 are provided in the rear housing 78 to facilitate the assembly. Next, the pins 118 are inserted through the bosses 120 into the bezel 116 and fastened to the bezel 116 by any suitable means such as by threaded tips 222 on the pins 118. Then the push rods 164 and 176 are connected by the pins 166 and 184 to the bosses 168 and 178 on the bezel 116. The light sources 152A and 152B are inserted into the forward housing 76. The converging lens 22, the cryogenic assembly 51 and the detector assembly 26 are joined together and to the forward housing 76 as described hereinbefore. The forward housing 76 is then joined to the rear housing 78, and finally the potentiometer 206 and its gear 210 are positioned by means of the bracket 214.

Referring now to FIG. 8 there is shown a detailed sectional view of the detector assembly 26 and the cryogenic assembly 51 which are encased in the case 92. FIG. 8 also shows the sleeve 96 and collar 98 for attaching the case 92 to the converging lens 22. The detector assembly 26 comprises a plurality of detector elements 56 arranged as shown in FIG. 3 and affixed to mounts 224 which are supported by a sapphire base 226, sapphire being utilized because of its great thermal conductivity which, as will appear presently, is most desirable for maintaining the detector elements 56 at a low temperature. The sapphire base 226 is held in thermal contact against a glass envelope 228 by means of a cylindrical kovar bracket 230. The glass envelope 228 is evacuated via a tip-off 232 to provide an insulating vacuum, the tip-off 232 being sealed after the air has been evacuated from the glass envelope 228. The technology of glass envelopes including the sealing of kovar to glass is well known and will not be discussed further. A cooling coil 234 in the form of a copper tube having an orifice 236 adjacent the sapphire base 226 contains compressed nitrogen provided by the nitrogen supply 53 via conduit 52A, seen also in FIG. 1. The nitrogen escapes through the orifice and expands, resulting in the well known Joule-Thompson cooling effect which cools the glass envelope 228, the sapphire base 226 and the other portions of the detector assembly 26 which will be described presently. The cold nitrogen gas then flows past the cooling coil 234 and is permitted to escape into the atmosphere.

A filter 238 for infrared radiation is supported by the kovar bracket 230 in front of the detector elements 56. The filter 238 is maintained at a low temperature in order to minimize the amount of infrared radiation emanating from the filter 238 itself to which the detector elements 56 would be responsive. The filter 238 is made by a well known technique in which a sapphire or silicon substrate is coated with well known materials to provide the desired infrared spectral pass band.

A cold shield 240 comprises an inner apertured disk 242 and an outer apertured disk 244 which are positioned in front of the detector elements 56 such that the apertures provide an entrance angle of approximately 60 degrees to radiation incident upon the detector elements 56. The cold shield 240 which comprises a material such as kovar is maintained at a low temperature to minimize the amount of infrared radiation produced by the cold shield 240, thereby insuring that the detector elements 56 will be responsive only to radiation generated external to the detector assembly 26 and falling within the entrance angle.

Continuing with the construction of the cryogenic assembly 51 and the detector assembly 26, electrical conductors from each of the detector elements 56, one such electrical conductor 246 being shown in FIG. 8, are supported by the sapphire base 226 and then pass through the kovar bracket 230, continue along the kovar bracket 230, and then pass along the inner surface of the glass envelope 228 where the electrical conductors, such as the electrical conductor 246, are conveniently plated along the inner surface of the glass envelope 228. The electrical conductor 246 exits from the back end of the glass envelope 228 in the form of a wire 248. The window 94 at the front end of the cryogenic assembly 51 is attached to a cylindrical portion 250 of the glass envelope 228, and then this cylindrical portion 250 is joined to the remainder of the glass envelope 228 by means of a kovar ring 252. The glass envelope 228 is then inserted into the case 92 with the aid of two sleeves 254 and 256, preferably of polytetrafluoroethylene available commercially as "Teflon," which provide a snug fit between the glass envelope 228 and the case 92 and also serve as an insulator against mechanical shock. The two sleeves 254 and 256 and the glass envelope 228 are secured in position by means of a collar 259 tightened against the sleeve 256.

Figure 9:
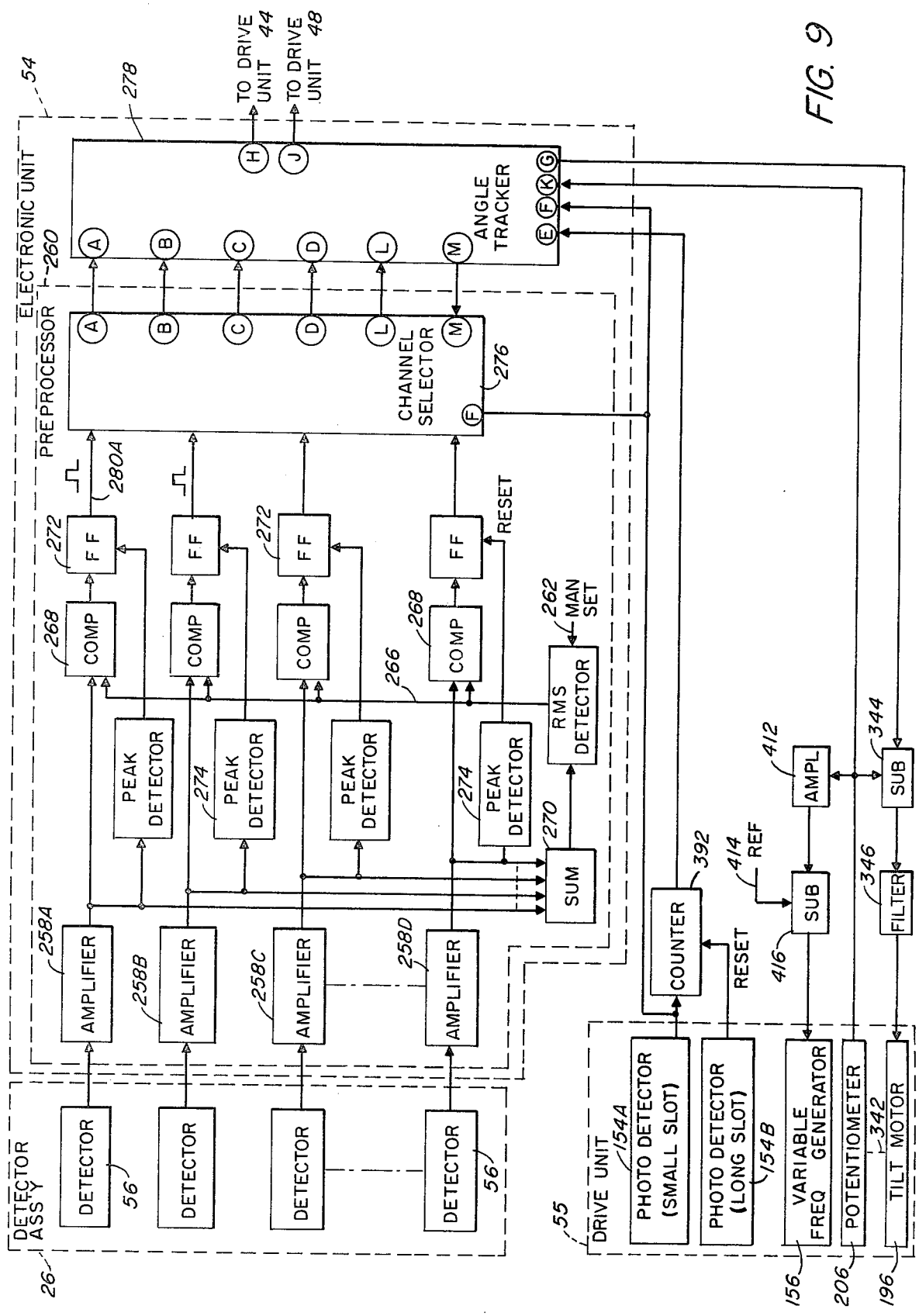
FIG. 9 is a block diagram of an electronic unit for processing data obtained from the detector elements.

Referring now to FIG. 9, there is shown a block diagram of the electronic unit 54, also seen in FIG. 1, which as has been mentioned above, receives signals from the detectors of the detector assembly 26, seen in FIGS. 1 and 8, and in response thereto provides electrical signals for the drive units 44 and 48, seen in FIG. 1, for orienting the focusing unit 21. The electronic unit 54 comprises a plurality of amplifiers each of which correspond to one of the seven detector elements 56 of the detector assembly 26, four such amplifiers being indicated by the reference numerals 258A-D each of which connects with a detector element 56 for amplifying the signals provided by the detector elements 56 in response to radiation incident upon the detector elements 56. The amplifiers 258A-D are a part of a reprocessor 260 within the electronic unit 54 which has the function of transforming the waveform of the detector signals into a rectangular waveform. The waveform of a detector signal provided by a detector element 56, as is well known, has a relatively fast rise time followed by a relatively long decay. The leading edge of the detector signal, as may be visualized by reference to FIG. 3 is seen to rise in magnitude as a detector element 56 traverses the cooler outer edge of the plume 34 and then passes into the warmer portion of the plume 34. Or if the plume 34 is regarded as a point source, the leading edge of the detector signal may be regarded as arising from the convolution of the point source signal with the detector element 56 as it passes by the point source; if such point source merely touches the edge of a region 66 the rise time is relatively short while if the point source intercepts the central portion of the region 66 then the rise time is relatively long. It is therefore evident that the rise time of a detector signal provides information as to the location of the plume image 58 relative to a circular path 60.

The preprocessor 260 of FIG. 9 also provides a threshold level against which a detector signal is compared to determine whether the detector signal is due to background radiation or is due to the more intense radiation obtained from an object such as object 31 of FIG. 1. Only such detector signals that have amplitudes above the threshold level are further processed by the preprocessor 260 to provide the aforementioned rectangular waveform having a width proportional to the rise time of the detector signals.

The threshhold level may be set by a manual setting 262 of the detector 264 to provide a preset voltage on line 266 for comparators 268 against which the signal from amplifiers 258A-D are compared. Or, alternatively, the threshold level is provided automatically for varying values of background radiation by means of a summing network 270 which accepts the signals from all of the amplifiers 258A-D and provides the sum to the detector 264. The detector 264 provides an output voltage on line 266 equal to the root mean squared (RMS) value of the sum signal provided by the summing network 270.

The preprocessor 260 provides the aforementioned rectangular pulse in the following manner. Each comparator 268 in response to a signal above threshhold from its corresponding amplifier of the amplifiers 258A-D provides an output signal which triggers a corresponding flip-flop 272. The flip-flops 272 are reset by signals from corresponding peak detectors 274 which are connected to the amplifiers 258A-D. The peak detector 274 provides an output pulse at the occurrence of the peak value or equivalently the end of the rise time, of the signal provided by the corresponding one of the amplifiers 258A-D. The peak detector 274 may comprise a well known circuit, such as, for example, an envelope detector having a relatively long capacitive discharge time, with the output of the envelope detector being compared by means of a comparator to the input signal such that the comparator provides an output pulse when the input signal voltage drops below that of the envelope detector. The output signal of each flip-flop 272 is therefore seen to be a rectangular pulse having a width equal to the duration of the rise time of the corresponding detector signals provided by the detector elements 56.

The preprocessor 260 also comprises a channel selector 276, to be described hereinafter which selects one or more signals from the respective flip-flops 272 to be utilized by the angle tracker 278 of the electronic unit 54, to be described hereinafter which generates the signal for the drive units 44 and 48 of FIG. 1. For example, it may be desired to track the signal appearing in channel A, that is, the signal provided by amplifier 258A. Accordingly, the channel selector 276 selects the rectangular pulse signal on line 280A and transmits it via terminal A to terminal A of the angle tracker 278.

Figure 10:
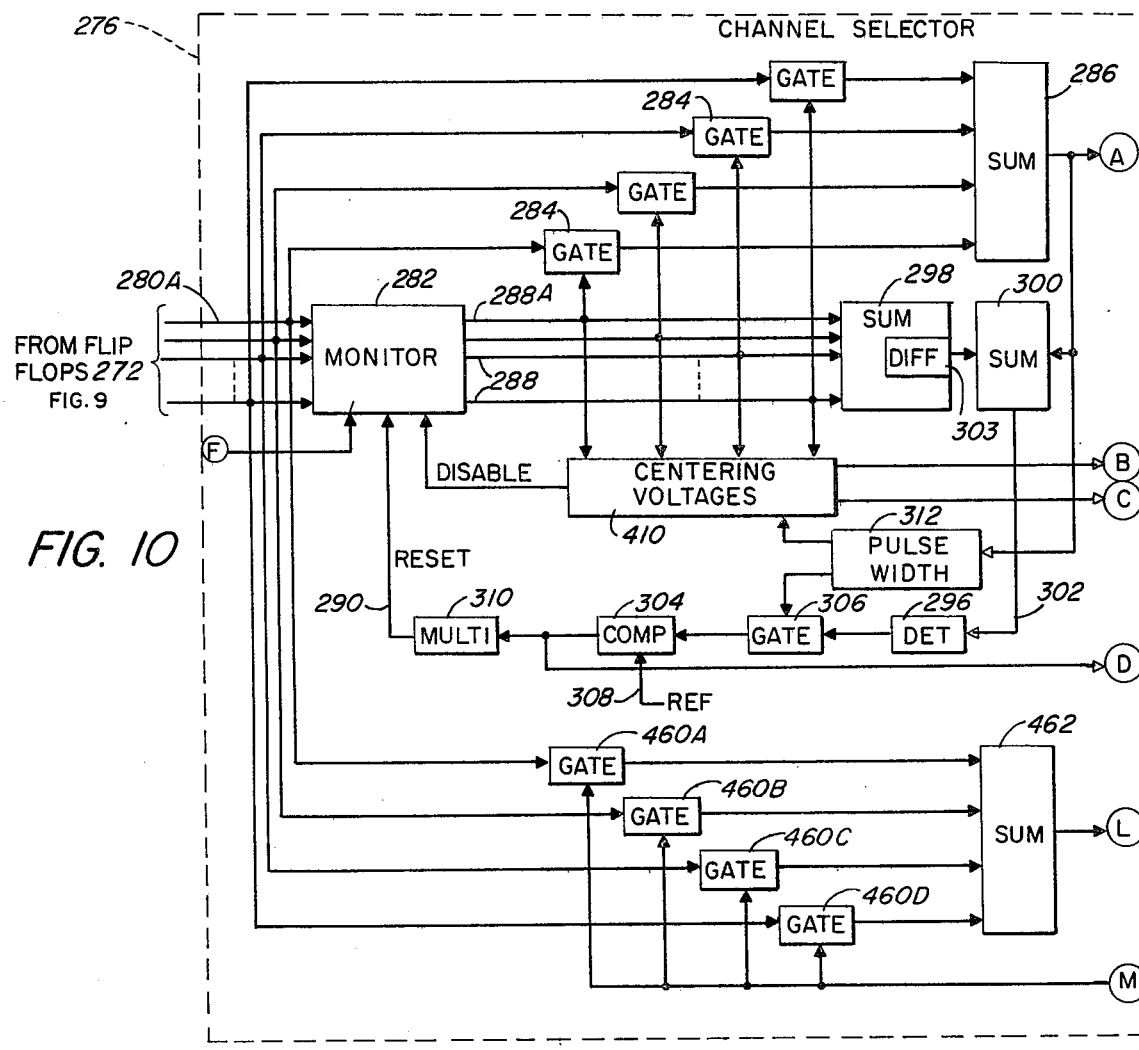
FIG. 10 is a block diagram of a channel selector for selecting data from a particular detector element.

Referring now to FIG. 10 there is shown a block diagram of the channel selector 276. In this embodiment of the invention the channel selector has been provided with means for selecting two channels to permit simultaneous tracking of object 31 of FIG. 1 by means of two adjacent detector elements of FIG. 3. First, one channel is selected based on a logical arrangement which may be illustrated by considering the situation where several point targets may be imaging on the image plane of the detector assembly 26. It is desirable to track one of these targets, the selected target being chosen by a criteria such as for example, the first signal to appear in any one of the seven channels of the preprocessor 260 of FIG. 9 or, alternatively, it may be desirable to examine all of the channels and select a target within the channel corresponding to the central detector element 56 of FIG. 3 hereinafter referred to as the tracking channel, or as a further alternative, it may be desirable to choose the target with the biggest amplitude, this being presumably the nearest target and one of paramount interest. The block diagram of FIG. 10 illustrates the first criteria, namely, selecting the target which is first to appear. The second channel can be selected in accordance with signals applied at terminal M from the angle tracker 278 as will be described hereinafter.

The channel selector 276 comprises a monitor 282 responsive to the signals from the flip-flops 272, a plurality of gates 284 each of which corresponds to a flip-flop 272, and a summing network 286 for selecting the rectangular waveform signal from one of the flip-flops 272 such as the signal on line 280A to appear at terminal A. As a matter of convenience in implementing the summary network 286, a logical OR circuit is readily utilized in view of the fact that pulse signals are passed by only one gate 284 at a time and are of uniform amplitude, there being a temporal variation in the pulse width only. The pulse width is accurately reproduced by an OR circuit. The monitor 282 is responsive to the signal from the flip-flop in each of the channels and comprises a well known type of circuit for providing a signal on an output line such as line 288A corresponding to the input channel in which a signal was first to appear, such as the signal appearing on line 280A. The signal provided on line 288A persists until such time as the monitor 282 is reset.

The monitor 282 is of a well known form and may comprise for example, a plurality of flip-flops one corresponding to each input channel, and reset via a plurality of OR gates one such gate corresponding to each flip-flop. The flip-flop and the OR gates are interconnected in their well known manner such that the first flip-flop to be energized from the rectangular waveform signals, such as the signal on line 280A, is set and all the other flip-flops are placed in a reset position where they remain until the monitor 282 is reset by a signal on line 290. The flip-flop that was triggered by the signal on line 280A provides the signal on line 288A.

In operation, therefore, in response to the first signal to appear from the flip-flops 272 of FIG. 9 the monitor 282 provides a signal on a corresponding output line 288 to activate the corresponding gate 284. In this way the rectangular waveform signal from the flip-flop 272 of the selected channel passes through the corresponding gate 284 into the summing network 286 to appear at terminal A. The passage of rectangular waveform signals from the other flip-flops is blocked by the remaining ones of the gates 284 and do not pass through the summing network 286 to terminal A.

In addition to selecting the signal channel, the channel selector 276 further provides means for ascertaining whether an input signal represents a valid target or simply a large radiant region, such as a cloud in the sky or buildings on the ground, and in response to this determination, initiate or terminate an acquisition procedure. This function is more readily explained by first describing the acquisition procedure and the tracking procedure utilized in this embodiment of the invention.

The acquisition procedure may be described by reference to FIG. 3 in which the plume image 58 is shown at a location relative to the array of detector elements 56 such that no region 66 swept out by a detector element 56 intercepts a portion of the plume image 58. Assuming a constant radius $R_1$ of a circular path 60 and a constant orientation of the exhaust plume 34 of FIG. 1 relative to the optical system 20, it is apparent that none of the detector elements 56 receive radiation of the plume image 58 and, therefore, with reference to FIG. 9 no signals are present in the signal channels of the amplifiers 258A–D. Acquisition of the plume image 58 is accomplished by decreasing the radius $R_1$, seen in FIG. 3, uniformly so that each region 66 spirals inwardly providing coverage of the regions enclosed by the circular paths 60. As has been mentioned hereinbefore the radius $R_1$ is related to the angular tilt of the mirror 24 of FIG. 1 and is controlled by the drive unit 55 in response to commands of a tilt controller 292 which will be described with reference to FIG. 13. The acquisition procedure is thus implemented by varying the desired radius $R_1$ of each circular path 60 such that the circular path 60 is converted into a spiral which brings a detector element 56 in towards the center of each circular path 60 at which point the radius $R_1$ is then increased to a maximum value whereupon the inward spiral is resumed.

Figure 13:
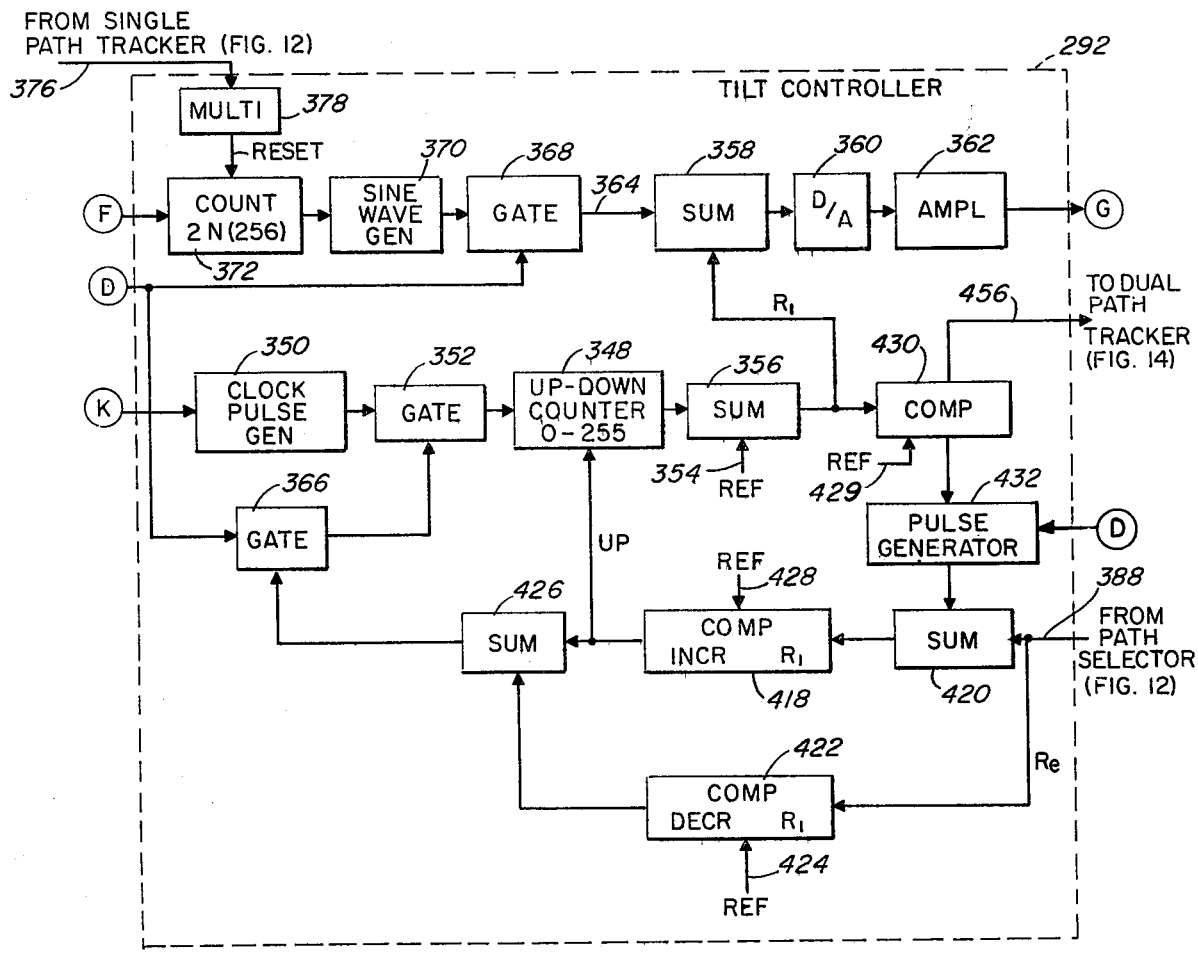
FIG. 13 is a block diagram of a tilt controller for positioning a mirror of the focusing system to effect a scanning of an image.

When a portion of the target plume 58 is intercepted by a detector 56 the channel selector 276 of FIG. 10 transmits a signal via terminal D, in a manner to be described, to the tilt controller 292 of FIG. 13 to terminate the spiral motion of the detector elements 56 relative to the plume image 58. Thus, successive passes of the detector element continue to intercept the plume image 58. Tracking of the plume image 58 of FIG. 3 can now commence since the successive intercepts of the plume image 58 by a detector element 56 provides a corresponding succession of signal pulses at terminal A of the channel selector 276. These signal pulses are then transmitted to the single path tracker 294, to be described with reference to FIG. 12, which generates tracking signals for positioning the optical system 20 such that the plume image 58 remains on the circular path 66.

In addition, during the tracking procedure, the tilt controller 292 of FIG. 13 provides a small periodic modulation of the magnitude of the radius $R_1$, in a manner to be described, such that the detector elements 56 of FIG. 3 are seen to move inwardly and outwardly with reference to their respective circular paths 60 on successive revolutions about the circular paths 60. This enables the single path tracker 294 to develop the target tracking signals; the signals received corresponding to the outward and inward deviations from a circular path 60 are compared to determine whether the plume image 58 has moved radially outwards or inwards. In the event that a target becomes lost, such as for example, if the jet aircraft 32 of FIG. 1 were to become occluded by a cloud, then the signal provided by the channel selector 276 at terminal D would terminate and the spiral paths of the acquisition mode would be reinstated.

Referring again to FIG. 10 the description of the channel selector 276 is now resumed. The channel selector 276 further comprises a detector 296 responsive to signals provided by the monitor 282 on lines 288 and to signals appearing at terminal A which are combined by means of summing networks 298 and 300 and transmitted to the detector 296 along line 302. The summing network 298 includes a differentiator 303 to provide a pulse output only at the initial occurrence of a signal on a line 288, the differentiator being required since the signal on a line 288 remains present as long as a selected channel is utilized for tracking a target. The detector 296 comprises a well known resistor capacitor network in which the capacitor is charged to the voltage of the incoming pulse signals along line 302, the discharge time of the resistor capacitor network being longer than the interpulse period of the pulses appearing at terminal A. The output voltage of detector 296 is applied to comparator 304 via gate 306 and has a value greater than the value of a reference voltage 308 of the comparator 304 when a train of pulse signals appears on line 302, this value falling below that of the reference voltage 308 when pulse signals no longer appear on line 302.

The comparator 304 provides alternately two values of voltage referred to hereinafter as a high and low voltage at terminal D. The comparator 304 in response to the presence of a voltage from the detector 296 having a value greater than the reference voltage 308, provides a signal, namely the high voltage, which activates the tilt controller 292 of FIG. 13 in a manner to be described, and the low voltage when the voltage provided by the detector 296 is below the voltage of the reference voltage 308. The multivibrator 310 is responsive to a change in the voltage provided by the comparator 304 and provides a reset signal along line 290 to the monitor 282 whenever the voltage changes from the high voltage to the low voltage, as for example, in the event that a target should become lost in which case the pulses on line 302 no longer appear.

A pulse-width unit 312 responsive to pulses appearing at terminal A is provided for activating the gate 306 to pass the voltage of the detector 296 to the comparator 304 when the pulses appearing at terminal A have an acceptable width which indicates the presence of an acceptable target such as the plume 34 of FIG. 1 rather than a large radiant area such as a cloud. The pulse width unit 312 has a well known form and may comprise, for example, a counter which is activated by the leading edge of the pulse appearing at terminal A, the counting continuing during the duration of the pulse until the counter is stopped in response to the trailing edge of the pulse. The total count is then compared with a preset reference included within the pulse width unit 312, whereupon a signal is transmitted to the gate 306 when such count is less than that of the reference. In the event that the count is equal to or greater than the reference, no signal is transmitted to the gate 306. The counter in the pulse width unit 312 resets itself to zero after completing the measurement of the pulse width. The signal provided for activating the gate 306 is retained unless an overly large pulse width is measured, at which time the gate 306 is deactivated. The output signal of the pulse width unit 312 is preferably applied by means of a resistor capacitor circit, such as that of the detector 296, so that in the event that pulses no longer appear at terminal A, as in the case of a lost target, the output signal of the pulse width unit 312 decays to a low value which deactivates the gate 306. In this way the signal provided at terminal D to activate the tilt controller 292 of FIG. 13 for terminating the acquisition phase is responsive to the width of pulses appearing at terminal A.

Figure 11:
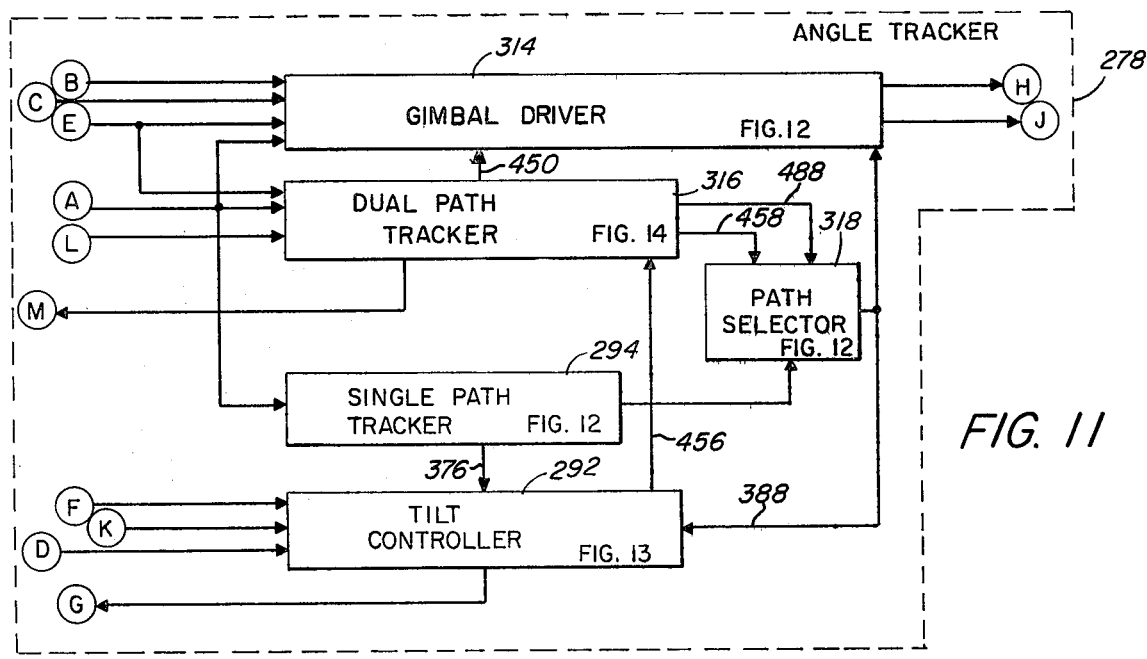
FIG. 11 is an overall block diagram of an angle tracker for developing tracking error signals to implement the tracking of the target of FIG. 1.

Referring now to FIG. 11 there is shown a block diagram of the angle tracker 278 which was referred to earlier with reference to FIG. 9. In addition to the single path tracker 294 and the tilt controller 292 already mentioned hereinbefore, the angle tracker 278 further comprises a gimbal drive unit 314, a dual path tracker 316 and a path selector 318. The terminal connections, indicated by the letters, correspond to those shown in FIG. 9. In addition there are interconnections between the various units of the angle tracker 278 which will be described with reference to these units, namely, the gimbal drive unit 314, the single path tracker 294, and the path selector 318 which will be described hereinafter with reference to FIG. 12, and the tilt controller 292 and the dual path tracker 316 which will be described respectfully with reference to FIGS. 13 and 14.

Figure 12:
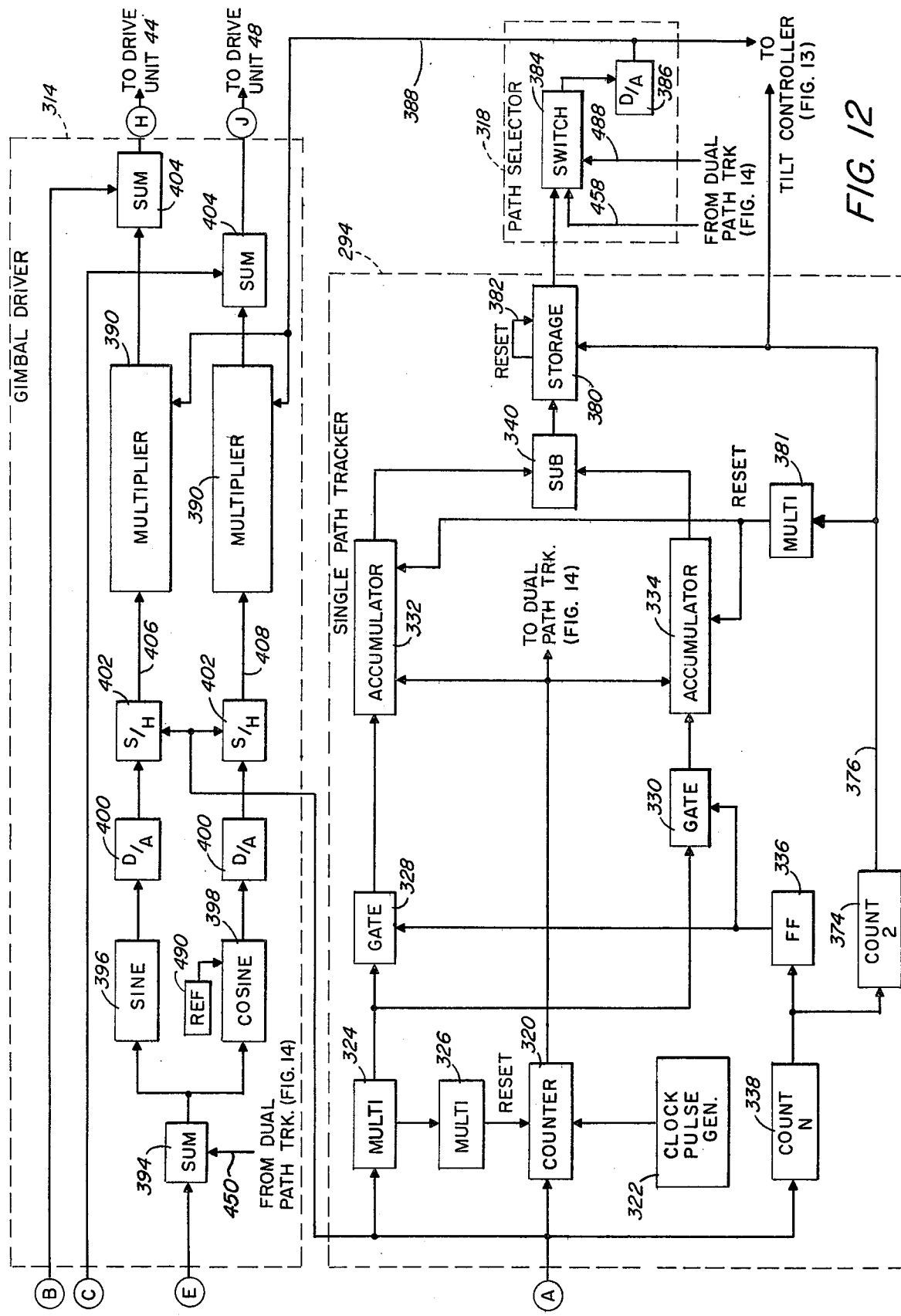
FIG. 12 is a block diagram of a gimbal drive unit and a single-path tracker which form a part of the angle tracker of FIG. 11.

Referring now to FIG. 12 there is shown a block diagram of the sinle path tracker 294 which comprises a counter 320, a clock pulse generator 322, two multivibrators 324 and 326, two gates 328 and 330 and two accumulators 332 and 334. The counter 320 is gated on by the leading edge of a pulse appearing at terminal A and gated off by the trailing edge of such pulse. During the interval between the leading and the trailing edge of each pulse appearing at terminal A, the counter 320 counts pulses provided by the clock pulse generator 322 and provides to the accumulators 332 and 334 a total count representing the width of the pulse at terminal A. The accumulators 332 and 334 are activated alternatively by gates 328 and 330, multivibrator 324 and flip-flop 336. The gates 328 and 330 are activated alternatively by flip-flop 336, gate 328 being responsive to a voltage level of one value from the flip-flop 336 and the gate 330 being responsive to the voltage of a second value from the flip-flop 336. As the flip-flop 336 changes state from one value of voltage to the other in response to input pulses from a counter 338, the gates 328 and 330 are alternatively activated. The multivibrator 324 in response to each pulse appearing at termainal A provides pulses which are passed either by gate 328 or by gate 330 to activate respectively accumulator 332 or accumulator 334 to receive the count from the counter 320. The pulse width of the pulse provided by multivibrator 324 is sufficiently long to permit the count of counter 320 to be entered into the accumulators 332 and 334. The counter 320 is reset after the count has been entered into the accumulators 332 or 334, the resetting being accomplished by multivibrator 326 in response to the trailing edge of the pulse provided by multivibrator 324.

As was mentioned earlier with reference to the preprocessor 260 of FIG. 9, the width of a pulse appearing at terminal A of the channel selector 276 is proportional to the rise time of the detector signal provided by a detector element 56, and that the rise time is related to the location of an image point to the detector element 56 such as, for example, a portion of the plume image 58 relative to the circular path 60 of FIG. 3. Accordingly, the count provided by the counter 320 of FIG. 12 is related to the position of the plume image 58 relative to a circular path 60, and that such count will increase or decrease as the plume image 58 moves into a region 66 or out of the region 66 seen in FIG. 3. A tracking error signal is obtained by varying the radius $R_1$ of a circular path 60 in a periodic manner, to be described, and synchronizing the operation of the flip-flop 336 of FIG. 12 such that the count of counter 320 is entered into the accumulator 332 when $R_1$ has been increased, and entering the count of counter 320 into the accumulator 334 when the radius $R_1$ has been decreased. A difference between the count stored in the accumulator 332 and the count stored in the accumulator 334 is obtained by subtractor 340, this difference being zero when the image, such as plume image 58, is centered on a circular path 60, the difference having a positive or negative value when the image is positioned respectively on the outer edge or an inner edge of a region 66. This periodic variation in the value of the radius $R_1$ will now be described with reference to FIGS. 12 and 13.

Referring now to FIG. 13 there is shown a block diagram of the tilt controller 292. The tilt controller 292 provides a drive signal for the tilt motor 196 seen in FIG. 9 by means of a well known servo loop which comprises the potentiometer 206 mechanically connected to the tilt motor 196, as indicated by the dotted line 342, a subtractor 344 for forming the difference between the potentiometer voltage and the signal of terminal G, and a filter 346 interconnecting the subtractor 344 and the tilt motor 196 to provide well known servo loop compensation. The voltage provided at terminal G is proportional to the desired radius $R_1$, seen in FIG. 3, and the voltage provided by the potentiometer is related to the angle of tilt of the mirror 24, seen in FIG. 5 and thus represents the actual instantaneous radius of circular path 60, seen in FIG. 3. The output voltage of the subtractor 344 is zero when the actual radius of a circular path 50 equals the desired radius $R_1$.

During the acquisition phase or at such times when the low voltage is present at terminal D, a counter 348 which is an UP-DOWN counter receives the pulses from a clock pulse generator 350 via a gate 352 and in response thereto counts DOWN. The counter 348 is a recycling type which counts, for example, from 0 to 255 and then returns to 0, or alternately, counts from 255 to 0 and then returns to 255. The digital number appearing at the output of counter 348 is then summed with a digital reference 354 by a summer 356 to give a digital number representing the value of the radius $R_1$, seen in FIG. 3. The reference 354 represents a minimum value of radius $R_1$. The value of $R_1$ is then passed through a summer 358, to be described hereinafter, to a digital-to-analog converter, hereinafter referred to as D/A 360 which converts the digital number to an analog voltage representing the value of the radius $R_1$. An amplifier 362 interconnects the D/A 360 to the terminal G for amplifying signal of the D/A 360 to provide sufficient power for activating the tilt motor 196 of FIG. 9.

At the termination of the acquisition procedure and the initiation of the tracking procedure, or whenever the high voltage appears at terminal D, the value of $R_1$ becomes constant and a periodic perturbation on line 364 is summed with $R_1$ at the summer 358 so that the radius of a circular path 60, seen at FIG. 3, undergoes the periodic variation mentioned earlier with respect to the single path tracker 294 of FIG. 12. The high voltage at terminal D passes through the gate 366 to turn OFF gate 352 thereby arresting the passage of pulses from the clock pulse generator 350 to the counter 348. Thus, the count of the counter 348 remains constant, and accordingly, the value of $R_1$ remains constant.

The high voltage at terminal D also activates gate 368 to pass the digital number provided by a generator 370 which provides a periodic waveform such as a sinusoid. In this case the sinusoidal waveform is represented by a sequence of digital numbers having a value equal to the sine of the digital number provided by a counter 372.

The period of the sinusoid provided by the generator 370 is synchronized with the flip-flop 336 of FIG. 12 in the following manner. As seen in FIG. 12, the counter 338 counts N of the pulses appearing at terminal A where N is equal to an interger 1, 2 or 4. After counting N of these pulses the counter 338 provides a pulse for activating the flip-flop 336 and then resets itself to 0. Thus the flip-flop 336 alternately activates the gates 328 and 330 after every single, second or fourth pulse appearing at terminal A. A counter 374 is responsive to the pulses provided by the counter 338 and provides an output pulse on line 376 after counting two of the pulses of counter 338 whereupon the counter 374 resets itself to 0. Thus, a pulse appears on line 376 for each complete cycle of the flip-flop 336.

The pulse on line 376 activates a multivibrator 378 in the tilt controller 292 as seen in FIG. 13. In response to the pulse on line 376 the multivibrator 378 transmits a pulse of a preset width to reset the counter 372 to 0 and thereby initialize the period of the waveform provided by the generator 370. The counter 372 is responsive to the trailing edge of the pulse provided by the multivibrator 378 so that by adjusting the pulse width provided by the multivibrator 378 the temporal relationship between the resetting of the counter 372 and the occurrence of a pulse at terminal A in FIG. 12 can be preset to any desired value. The counter 372 is also responsive to pulses at terminal F provided by the photodetector 154A in the drive unit 55 seen in FIGS. 5 and 9. Again, assuming that there is a total of 256 slots (the 255 slots 148 and the single slot 150) in the rotary member 122 of FIG. 7, the counter 372 of FIG. 13 counts a total of 2 N(256) counts and then recycles to 0. The generator 370 produces a sine wave having a period equal to 2 N(256) so that the counter 372 recycles once for each period of the sine wave provided by the generator 370. Thus, the signal representing the radius $R_1$ plus the sinusoidal perturbation appearing at terminal G drives the tilt motor 196 of FIG. 9 such that the region 66 of FIG. 3 spirals inwardly and outwardly cyclically by an amount equal to approximately the width of the region 66, this cyclical spiraling being done in synchronism with the occurrences of pulses at terminal A of FIG. 12.

Returning again to FIG. 12 the tracking error signal provided by the subtractor 340 is entered into a storage unit 380 for which the pulse on line 376 serves as the strobe pulse for entering the digital number of the subtractor 340 into the storage unit 380. The pulse on line 376 also triggers multivibrator 381 to reset the accumulators 332 and 334 after the occurrence of the pulse on line 376 by a preset delay provided by the multivibrator 381, this delay being sufficient to permit entry of the digital number in the subtractor 340 into the storage unit 380. As has already been mentioned, the pulse on line 376 occurs once during each perturbation cycle of the radius of the circular path 60 of FIG. 3, and accordingly, the digital number in the storage unit 380 is updated with each of the perturbation cycles. A time delayed reset 382, indicated diagramatically by an arrow in FIG. 12, is provided by the storage unit 380 to reset the contents of the storage unit 380 to 0 in the event that pulses fail to appear along line 376 as, for example, in the case of a lost target so that the tracking error signal provided at the output of the storage unit 380 is zero with the result that the missile 30 of FIG. 1 flies a straight path. The tracking error signal of the storage unit 380 is passed by a switch 384, to be described hereinafter, to D/A 386 which converts the digital number to an analog voltage which is applied along line 388 to multipliers 390 of the gimbal drive unit 314 in a manner to be described.

Referring again to FIG. 9 there is shown a counter 392 responsive to the pulse signals provided by the photodetector 154A and counting these pulse signals to provide at terminal E a digital number indicating such count which is utilized by the gimbal drive unit 314 of FIG. 12 in a manner to be described. The counter 392 is reset by the pulse signal provided by the photodetector 154B. Since the reset pulse from the photodetector 154B occurs once for every 256 pulses from the photodetector 154A, as has been described earlier with reference to the slots 148 and 150 of the rotary member 122 seen in FIG. 7, the output of the counter 392 varies from 0 to 255 cyclically with the count indicating the angular orientation of the rotary member 122 about its axis, as well as the direction of a beam of radiation incident from an object such as the object 31 of FIG. 1.

Referring now to FIG. 12 there is shown a block diagram of the gimbal drive unit 314. The gimbal drive unit 314 comprises a summing circuit 394, a sine generator 396, a cosine generator 398. a pair of digital-to-analog converters each of which is referred to hereinafter as D/A 400, a pair of sample-and-hold circuits each of which is referred to hereinafter as S/H 402 and a pair of summing circuits 404. The digital number at terminal E is passed via the summing circuits 394, to be described hereinafter, to the sine generator 396 and the cosine generator 398 which provide digital outputs respectively representing the sine and the cosine of the angular orientation of the rotary member 122 (of FIG. 7) about its axis. The digital outputs of the sine and cosine generators 396 and 398 are converted by the D/A's 400 to analog voltages which are then applied to the S/H's 402. The signals applied to each S/H 402 are stored upon command of the pulse appearing at terminal A. In this way the voltage stored in each S/H 402 represents respectively the sine and the cosine of the angular orientation of the target represented by the pulse at terminal A, such as, for example, the angular orientation of the object 31 of FIG. 1 relative to the optical system 20.

Each multiplier 390 multiplies the signal on line 388 by the sine signal and the cosine signal provided by the S/H's 402 respectively on lines 406 and 408. The multiplier comprises a well known circuit which provides an output signal having a magnitude and polarity (positive or negative) depending on the magnitudes and polarities of its input signals on line 388 and 406 or 408. It is apparent from the description of the single path tracker 294, presented hereinbefore, that the value of the signal voltage error on line 388 represents the radial component of the tracking signal, and that, since the voltages on lines 406 and 408 are proportional to the pitch and yaw coordinates of the tracking error signal the outputs of each of the multipliers 390 represent respectively the pitch and yaw components of the tracking error signal. These outputs of the multipliers 390 are then passed via summing circuits 404, to be described hereinafter to the drive units 44 and 48 seen in FIG. 1 for adjusting the orientation of the optical system 20.

In operation, therefore, the electronic unit 54, the drive units 44 and 48 and the gyroscopic assemblies 49 of FIG. 1 coact with the optical system 20 to track a target such as the object 31. The optical system 20 is maintained in a spaced stabilized position by means of the gyroscopic assemblies 49 and the drive units 44 and 48 which respond in a well known manner to signals generated by the gyroscopic assemblies 49 to operate the tilt arm assembly 36 for pitch stabilization and to pivot the frame 28 for yaw stabilization. The mirror 24 is rotated about the axis of the optical system by the drive unit 55 and, in response to signals provided during acquisition by the tilt controller 292 of FIG. 13 to the drive unit 55, the mirror 24 is tilted through an angle that varies periodically, substantially in the manner of a saw tooth waveform. When a detector element 56 of FIGS. 3 and 9 intercepts an image point of the object 31, a comparator 268, flip-flop 272 and peak detector 274 provide a rectangular pulse having a width equal to the rise time of the detector signal. The rectangular pulse enters the channel selector 276 (FIGS. 9 and 10) which in response thereto transmits a signal to the tilt controller 292 (FIG. 13) which initiates tracking and retains the angle of tilt so that upon subsequent rotations of the mirror 24 the detector element 56 continues to intercept the image point. In addition the channel selector 276 measures the width of the rectangular pulse, and if the width is acceptable, transmits further pulses in the channel of the detector element 56 to the single path tracker 294 of FIG. 12. Additionally, in response to the signal received from the channel selector 276, the tilt controller 292 provides a periodic perturbation to the radius of a circular path 60 of FIG. 3, in this embodiment is sinusoidal perturbation. Thus, the widths of the pulses provided to the single path tracker 294 (at terminal A) vary in a substantially periodic manner as occurs in the case of an image whose position on the face of the detector assembly 26 of FIG. 1 is constant or slowly moving relative to the rotation rate of the mirror 24. The periodically occuring widths of the pulses entering the single path tracker 294 (FIG. 12) are stored in the accumulators 332 and 334 such that the pulse widths occuring during one half the perturbation cycle are stored in the accumulator 332 while the pulse widths occuring in the second half of the pertubation cycle are stored in the accumulator 334. The difference between the stored quantities in the two accumulators 332 and 334 represents the radial component of the tracking error signal to be applied to the drive units 44 and 48 of FIG. 1 for correcting the position of the optical system 20 so that an image point is centered within a region 66 of FIG. 3. The radial component of the correction is resolved into pitch and yaw components by the gimbal drive unit 314 and applied respectively to the drive units 44 and 48. The drive units 44 and 48 utilize well known servo loops and, with the aid of the gyroscopic assemblies 49, drive the optical system 20 though the appropriate pitch and yaw angles to equalize the quantities stored in the accumulators 332 and 334. Thus, in the foregoing manner, a detector element 56 while spiraling inwardly with reference to an image point (FIG. 3) provides for the acquisition of the image point; and the detector element 56, while retaining a substantially constant radius of curvature relative to the image point with the exception of a relatively small periodic perturbation in the radius, generates tracking error signals for updating the orientation of the optical system 20 to track the object 31.

Referring again to FIG. 10 there is shown a means for tracking a target utilizing the central detector element 56 of FIG. 3. Utilizing the central detector element 56 for tracking the target, rather than utilizing the particular detector element which originally acquired the target as was described hereinbefore, has the advantage that, in the event a target should become lost during the tracking procedure, there is a greater probability of reacquiring the target. Accordingly, there is provided a center-voltage unit 410 within the channel selector 276 which is responsive to the signals on the lines 288 and provides a set of pitch and yaw voltages via gimbal drive unit 314 (FIG. 12) for the drive units 44 and 48 of FIG. 1. These voltages correspond to the particular line 288, such as line 288A, which has been energized by the monitor 282 in the selection of a channel. Accordingly, when a channel other than a channel corresponding to the central detector element 56 is selected, the center voltage unit 410 disables the monitor 282 for a present amount of time during which all gates 284 are deactivated and no signals arrive at terminal A. Thus, no signal appears on line 302 for the detector 296 with the result that a low voltage signal appears on terminal D thereby reactivating the acquisition tilt program for the mirror 24 of FIG. 1. The pitch and yaw correction voltages developed by the center voltage unit 410 appear at terminals B and C and are applied to the drive units 44 and 48 by means of the summing circuits 404. The pitch and yaw correction voltages are applied for the preset amount of time which has been set in accordance with the dynamic characteristics of the tilt arm assembly 36 and the optical system 20 so that the resultant reorientation of the optical system 20 brings the target image such as the image 58 of FIG. 3 in contact with the region closed by the central circular path 60. The monitor 282, after this present amount of time, then resumes operation to permit reacquisition of the target by the central detector element 56. After reacquisition the central detector element 56 is then utilized for tracking the target in the manner described hereinbefore.

It is also desirable to provide a variable rotation rate to the mirror 24 of FIG. 1 such that at small radii of the circular path 60 of FIG. 3 the rotation rate is increased so that the detector element 56 scanning the region 66 scans equal areas in equal amounts of time for a uniform data rate during acquisition. Accordingly, the voltage provided by the potentiometer 206 of FIG. 9 is applied via an isolation amplifier 412 and combined with a reference 414 in subtractor 416 to provide a voltage for the variable frequency generator 156, seen also in FIG. 5, which varies with the angle of tilt of mirror 24. The voltage of reference 414 is greater than that of the potentiometer 206. When the tilt angle of the mirror 24 is at a minimum value, the corresponding voltage from the potentiometer 206 is at its minimum value and the voltage provided by subtractor 416 is at a maximum value for maximum rotation speed of mirror 24. With increasing potentiometer voltages the subtractor provides a decreased voltage to the variable frequency generator which in response to this decreased voltage provides a lower frequency to the motor 128 of FIG. 5 to rotate the mirror 24 at a slower rate of rotation. In addition, the potentiometer voltage appearing at terminal K is applied to the clock pulse generator 350 in the tilt controller 292 of FIG. 13. The clock pulse generator 350 in response to the voltage at terminal K provides an increased pulse repetition frequency at the lower values of voltage at terminal K so that a detector element 56 of FIG. 3 tends to spiral in more rapidly towards an image such as the plume image 58 at the reduced value of radius $R_1$. Thus, the counter 348 counts DOWN at a faster rate at the smaller angles tilt of mirror 24 corresponding to the increased rate of rotation of the mirror 24. Thus, the detector element 56 scans equal units of area in equal amounts of time.

It is also desirable to provide means for increasing or decreasing the radius of the circular path 60 of FIG. 3 during large values of a tracking error signal for which there may be lag in the response of the servo loops of the drive units 44 and 48 of FIG. 1. Such a situation might arise for example from a perturbation in the atmosphere such as clear air turbulance which might cause a small deviation in the apparent angular orientation of the object 31 relative to the optical system 20. Accordingly, the radial component of the tracking error signal on line 388 at FIG. 13 is applied to a comparator 418 via a summer 420 (to be described hereinafter) and to a comparator 422. When the radial component of the tracking error signal, indicated as $R_e$ is more negative than the reference 424 the comparator 422 applies a voltage via summer 426 which closes off gate 366 so that the high voltage signal on terminal D is no longer applied to the gate 352. Then the pulses from the clock pulse generator 350 pass through the gate 352 to operate the counter 348, the counter 348 counting DOWN to decrease the radius $R_1$. In the event that $R_e$ is more positive than the reference 428, the comparator 418 provides a signal which causes the counter 348 to count UP and also passes the signal via summer 426 to close off the gates 366 with the result that gate 352 passes pulses from the pulse generator 350 to the counter 348. As a result the counter 348 counts UP thereby increasing $R_1$. When the value of $R_1$ has been altered sufficiently to reduce the magnitude of $R_e$ the gate 366 is again turned ON with the result that the high voltage signal at terminal D is again applied to the gate 352 to stop the flow of pulses from the clock pulse generator 350 to the counter 348.

Figure 14:
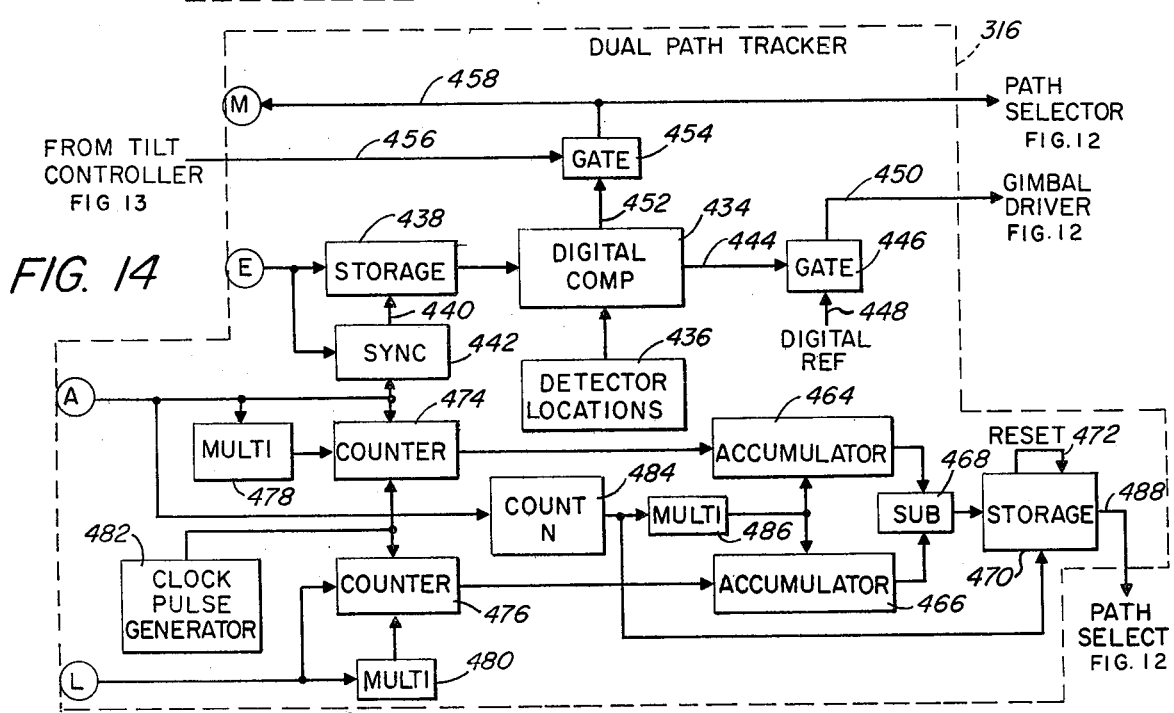
FIG. 14 is a block diagram of a dual-path tracker which forms a part of the angle tracker and is utilized for developing tracking error signals from a pair of detector elements.

Referring now to FIG. 14, there is shown a block diagram of the dual path tracker 316 which is utilized when it is desired to provide target tracking signals derived from two detector elements 56 of contiguous circular paths 60 as seen in FIG. 3. By use of the dual path tracker 316, the electronic unit 54 of FIG. 9, functions in a manner analogous to a split gate tracker, well known to the radar arts, in that the electronic unit 54 now provides signals for positioning the optical system 20 of FIG. 1 so that an image such as the plume image 58 is located at the intersection of two adjacent regions 66 of FIG. 3 to equalize the signal strength obtained from each of the corresponding two detector elements 56. In the ensuing description of the dual path tracker 316 it will be presumed that the optical system 20 has been positioned with the aid of the center voltage unit 410 of FIG. 10 such that the plume image 58 contacts the circular path 60 of the central detector element 56.

In order to initiate tracking of the plume image 58 the dual path tracker 316 must first orient the optical system 20 in both pitch and yaw such that the radius $R_1$ of each circular path 60 is large enough to intersect the adjacent circular paths 60 and also such that the plume image 58 is positioned at one of the intersections. In the embodiment shown in FIG. 3 there are six such possible locations for the plume image 58.

To increase the magnitude of the radius $R_1$ to the desired value as is indicated by a reference 429 in the tilt controller 292 of FIG. 13, a comparator 430 responsive to the difference between the radius $R_1$ and the reference 429 activates a pulse generator 432 to increase the value of the radius $R_1$ until it equals the magnitude of the reference 429 in the following manner. As was described earlier, a signal on line 388 applied to the comparator 418 via the summer 420 and having a value greater than the reference 428 causes the counter 348 to count UP thereby increasing the radius $R_1$. In a similar manner pulses provided by the generator 432 have a magnitude greater than the reference 428 and being applied to the comparator 418 via the summer 420 similarly cause the counter 348 to count UP. The pulse generator 432 is disabled during acquisition by means of the signal at terminal D so that the pulse generator 432 can be activated by the comparator 430 only during the tracking mode. The pulses provided by the generator 432 are of relatively short pulse width and have a relatively slow repetition frequency relative to the system response times of the electronic unit 54 and the drive units 55, 44, and 48 of FIG. 1 in order to permit tracking of the plume image 58 by the single path tracker 294, in the manner described earlier, as the radius $R_1$ is slowly increased.

The optical system 20 of FIG. 1 is further oriented in yaw and pitch so that the plume image 58 of FIG. 3 is positioned at one of the six intersections of the central region 66 with a peripheral region 66 in the following manner. A digital comparator 434 in FIG. 14 compares the angular orientation of the rotating member 122 of FIG. 7 with each of the six positions of the centers of the six peripheral paths 66 of FIG. 3, these positions being indicated by digital numbers representing the angular positions of these centers and stored in a storage unit of detector locations 436. The angular orientation of the rotary member 122 provided at terminal E is applied to a storage unit 438 which may be, for example, a shift register. The digital number at terminal E is entered into the storage unit 438 upon command of a pulse on line 440 and is thereafter made available to the digital comparator 434 until such time as the next pulse appears on line 440 for updating the digital number in the storage unit 438. A pulse on line 440 is provided by a synchronizer 442 responsive to the pulse signals at terminals E and A so that the pulse on line 440 is coordinated with the occurrence of the pulse at terminal E as well as the pulse at terminal A, which as has been described earlier, occurs when the rotary member 122 is so oriented that the plume image 58 is reflected by mirror 24 of FIG. 1 towards the central detector element 56. In this way the angular disposition of the plume image 58 relative to the axis of the optical system is applied to the digital comparator 434 for comparison with the detector location 436.

When the position of the plume image 58 as provided by the storage unit 438 differs significantly from any one of the detector locations 436, the digital comparator 434 provides a signal on line 444 to momentarily activate gate 446 which then transmits a digital reference 448 along line 450 to the summing circuit 394 in the gimbal drive unit 314 of FIG. 12. The digital reference 448 is applied only momentarily and then reapplied in response to successive applications of the signal on line 444 to provide an apparent angular position error for the gimbal drive unit 314, which in response thereto, causes a reorientation of the optical system 20 of FIG. 1. The correction in the orientation of the optical system 20 provided by the gimbal drive unit 314 is such as to move the plume image 58 along the circular path 60 of FIG. 3. The amount of this correction is proportional to the signal on line 388 of FIG. 12 due to the multipliers 390. It is thus seen that the correction in the orientation of the optical system 20 has both a radial component as well as an angular component, the angular component, provided by the digital reference 488 of FIG. 14, being relatively small compared to the radial component to insure proper tracking by the single path tracker 294 of FIG. 12. For example, a digital reference 448 on the order of 20°–30° may be utilized. In view of the fact that the centers of the circular paths 60 of FIG. 3 are spaced at 60° intervals around the center of the detector array, it is apparent that such a correction is sufficient to bring the plume image 58 within the region of intersection of two paths 66 while substantially retaining the radial component of the correction signal as is required for proper operation of the single path tracker 294 of FIG. 12.

When the digital number appearing at terminal E approximates one of the detector locations 436 the digital comparator discontinues the signal on line 444 and provides a steady signal on line 452 which is applied to a gate 454. The gate 454 is energized by a signal on line 456 which is provided by the comparator 430 of the tilt controller 292 in FIG. 13 when the radius $R_1$ is equal to the reference 429. Upon activation of the gate 454 by the signal on line 456, the signal from the digital comparator on line 452 is passed via line 458 through terminal M to the gates 460A–D of the channel selector 276 of FIG. 10, the signal on line 458 also being passed to the switch 384 of the path selector 318 in FIG. 12. The signal on line 458 is a digital number designating the detector element 56 on the circular path 60 which intersects the central circular path 60 at the approximate location of the plume image 58. Each of the gates 460A–D connect respectively with the signal channels of the preprocessor 260 of FIG. 9 in the same manner as do the gates 284; and similarily only four of the gates; namely, the gate 460A–D are shown. Each gate 560A–D is responsive to a different digital number provided by the digital comparator 434 so that the digital comparator 434 thereby selects the signal channel and its detector element 56 which is to be utilized in tracking the plume image 58. For example, if gate 460C is activated then the pulse signals in response to signals passing through the amplifier 258C of FIG. 9 are allowed to pass through the gate 460C via the summing network 462 and terminal L to the dual path tracker 316.

The radial component of the target tracking error signal is formed in a manner analogous to that utilized in the single path tracker 294 of FIG. 12. As seen in FIG. 14, two accumulators 464 and 466, a subtractor 468 and a storage unit 470 having an internal reset 472, indicated diagrammatically by an arrow, function in an analogous manner to that described earlier with reference to the accumulators 332 and 334, the subtractor 340, the storage unit 380 and the reset 382 of the single-path tracker 294. Pulses arriving from the central channel at terminal A and from the peripheral channel on terminal L are applied respectively to counters 474 and 476 and to multivibrators 478 and 480. The counters 474 and 476 function in the same manner as does the counter 320 of the single path tracker 294 and count pulses provided by the clock pulse generator 482 during the duration of respectively the pulse signals at terminals A and L. The outputs of counters 474 and 476 are applied respectively to the accumulators 464 and 466 in a manner similar to that described earlier for the counter 320 and accumulator 332 of the single path tracker 294. Counter 484 counts N of the pulses appearing at terminal A whereupon it provides an output pulse and recycles itself to zero in a manner analogous to that of the counter 338 of the single-path tracker 294. The accumulator 464 and 466 are reset by a pulse provided by a multivibrator 486 which is responsive to the pulse provided by the counter 484, in a manner analogous to the resetting of the accumulators 332 and 334 by the multivibrator 381 in the single-path tracker 294. The counters 474 and 476 are reset respectively by the multivibrators 478 and 480 after preset time delays respectively from the pulses at terminal A and terminal L in a manner analogous to the resetting of counter 320 by multivibrator 326 in the single-path tracker 294. Thus, it is seen that during successive rotations of the mirror 24 of FIG. 1 about its axis, successive counts in response to the pulses at terminal A are summed in the accumulator 464, and successive counts in response to the pulses at terminal L are summed in the accumulator 466, the difference between the stored numbers in the accumulators 464 and 466 being applied via the storage unit 470 and lines 488 to the switch 384 in the path selector 318 of FIG. 12. The signal on line 488 is the radial component of the target tracking error, and after passing to the D/A 386 is utilized by the gimbal drive unit 314 in the same manner as the tracking error signal previously described with reference to the single path tracker 294.

It may also be desirable in the utilization of both the single path tracker 294 and the dual-path tracker 316 in a multitarget situation to provide gating with inhibits the appearance of a second target in a tracking channel of the channel selector 276 which may momentarily appear on a circular path 60 of FIG. 3. To accomplish this, the pulse signals at terminal F are applied as clock pulses to a well known timing circuit (not shown) in the monitor 282 of FIG. 10 to permit a signal, such as the signal on line 288A controlling the gate 284 of the selected channel, to be periodically turned OFF during the interpulse interval by the timing circuit, so that the gate 284 passes signal pulses for the selected target but not for other targets.

It is frequently desirable to sum with the output of the cosine generator 398 of FIG. 12 a reference 490 having a value of typically 178 so that the tracking error signal $R_e$ on line 388 is multiplied by ($\frac{1}{2}$+cos $\sigma$) rather than simply cos $\sigma$. This prevents a condition referred to as "wander" in which the angle $\sigma$, the angular orientation of the rotary member 122 of FIG. 5, is seen to vary as a target is being tracked. the variation in $\sigma$, or "wander" is due to the fact, that in the absence of the reference 490, there is no preferred orientation of the rotary member 122 and since the angle tracker 278 of FIG. 11 corrects for the radial component of the tracking error, the missile 30 of FIG. 1 is free to wander about its axis. The addition of the reference 490 to the output of the cosine generator 398 provides a preferred angular orientation and thus eliminates wander. It also aids tracking of extended images.

The wander condition is alleviated, alternatively, by utilizing three detector elements 56 as shown in FIG. 2. The requisite adaptation of the channel selector 276 and the angle tracker 278 of FIG. 9 to utilize data provided by detector elements 56 of three contiguous areas, such as the areas 68A-C of FIG. 2, to track the plume image 58 at the center of the array of the areas 68A-C is readily understood from the teachings disclosed hereinbefore in the utilization of data from two detector elements 56. Accordingly, the channel selector 276 of FIG. 10 would be modified to include an additional set of gates 460 for the third detector element 56, and the dual path tracker 316 would be modified to provide additional signals at terminal M for selecting a gate in the additional set of gates. Also, the detector locations 436 of FIG. 14 would provide digital numbers relating to the center of the three areas 68A-C. An additional channel, such as that of the counter 474 and the accumulator 464 of FIG. 14 would be provided for the third detector element 56, and the substractor 468 would be replaced with a well-known circuit for vectorially combining the three contributions directly into yaw and pitch error components which are then applied via summing circuits 404 to the drive units 44 and 48. The multipliers 390 would, accordingly, be disconnected from the summing circuits 404 by suitable switching during the tracking by the three detector elements 56.

It is understood that the above-discussed embodiments of the invention are illustrative only and that modifications thereof will occur to those skilled in the art. Accordingly, it is desired that this invention is not to be limited to the embodiments disclosed herein but is to be limited only as defined by the appended claims.

What is claimed is:

1. In combination:
   a plurality of elements spaced apart in a first dimension and in a second dimension, said elements being responsive to radiant energy for providing a signal when illuminated by such energy;
   means for directing rays of radiant energy towards said elements such that successive ones of said rays impinge sequentially in a first dimension and in a second dimension upon selected ones of said elements; and
   means coupled to said directing means for selecting a number of said elements upon which said rays are to impinge, said directing means scanning said rays along arcuate paths, said directing means including means for varying the radii of said arcuate paths, said selecting means comprising:
   first means responsive to said signals of said elements for signaling the position of one of said elements relative to one of said arcuate paths;
   second means responsive to said signals of said elements for signaling the position of a second one of said elements relative to one of said arcuate paths; and
   third means responsive to said first and to said second signaling means for selecting an arcuate path providing for said impinging of said rays of radiant energy upon a said number of said elements.

2. A scanning system comprising:
   means for providing an image of an object to be scanned, said image being located upon an image plane;
   a plurality of elements responsive to radiant energy of said image for providing signals indicating the presence of such radiant energy, each of said elements being positioned along a first dimension and along a second dimension within respective contiguous portions of said image plane for scanning respective portions of said image;
   means for inducing a relative motion of each of said elements in a first dimension and in a second dimension relative to said respective portions of said image for scanning the areas of said portions, said motion means including means for scanning said areas at a uniform rate and means for varying said rate during a scanning of said portions; and
   means responsive to said signals of said elements for shifting a portion of an image scanned by one of said elements in one of said elements in one of said contiguous portions of the image plane to another of said contiguous portions scanned by a second of said elements.

3. The system of claim 2 including means responsive to data obtained simultaneously from said scannings of the areas of said portions of said image plane for designating the area to be scanned by one of said elements.

4. A system for locating an image within an image plane, said system comprising:
   a plurality of elements responsive to radiant energy of said image for providing signals when illuminated by such energy;
   means for generating a relative motion between said image and said elements such that each of said elements moves within said image plane in arcuate paths relative to said image;
   means for selecting a signal of at least one of said elements, said selecting means being responsive to the signals received from a plurality of said elements;
   means responsive to said selected signal for accumulating occurrences of said selected signal when the element providing said selected signal lies exteriorly to an arcuate path containing a point of said image, said accumulating means also accumulating occurrences of said selected signal when the element providing said selected signal lies interiorly of the arcuate path containing said point of said image; and wherein said motion generating means includes means responsive to the difference between said exterior accumulation and said interior accumulation for varying said arcuate path to provide an equality between said exterior accumulation and said interior accumulation.

5. The system of claim 4 further comprising means for repositioning said image plane such that at least one point of said image coincides with at least one point of the arcuate path traced by a preselected one of said elements.

6. The system of claim 5 wherein said arcuate paths varying means comprises means for varying the radii of curvature of said arcuate paths.

7. The system of claim 6 further comprising means responsive to said signals for signaling an intersection of said image with at least one of said arcuate paths.

8. The system of claim 6 wherein said image plane repositioning means includes means for combining data obtained from a plurality of said elements to effect a tracking of said image.

9. A radiation tracker system for tracking an incident beam of radiation comprising:
a hexagonal detector array, each detector of said array being positioned at the vertex of a hexagon, each of said detectors being spaced apart with a spacing between neighboring detectors which is larger than the sizes of said neighboring detectors;
focusing means positioned relative to said hexagonal detector array to direct rays of radiation towards the hexagonal detector array; and
means for driving said focusing means to scan said rays of radiation in a spiral scan, said driving means comprising:
means for providing a predetermined value of radius of said spiral scan;
means responsive to signals received by detectors of said detector array for varying said predetermined value of radius; and
means for generating a modulating signal, said modulating signal being combined with said predetermined value of radius to provide said spiral scan.

10. A radiation tracker system for tracking an incident beam of radiation comprising:
a hexagonal detector array, each detector of said array being positioned at the vertex of a hexagon, each of said detectors being spaced apart with a spacing between neighboring detectors which is larger than the sizes of said neighboring detectors;
focusing means positioned relative to said hexagonal detector array to direct rays of radiation towards the hexagonal detector array;
means for driving said focusing means to scan said rays of radiation in a spiral scan; and wherein
the center of said spiral scan is substantially coincident with the center of said hexagonal detector array, and the maximum radius of the spiral scan is substantially equal to the distance between the center and vertex of the hexagonal detector array.

11. The system of claim 10 including a central detector located at the center of said hexagonal detector array.

12. The system of claim 11 wherein said focusing means comprises an optical reflector adapted to be positioned by said driving means to direct the rays of radiation towards said central detector in the manner of a circular scan.

13. The system of claim 12 including receiving means synchronized with said optical reflector and connecting with said central detector for correlating radiation received by the central detector with the position of the optical reflector.

14. The system of claim 13 including positioning means responsive to said receiving means for orienting said focusing means relative to said incident beam of radiation to center said circular scan on the periphery of said central detector.

15. A radiation tracker system comprising:
a gyroscopically stabilized platform;
means for deflecting radiation;
a hexagonal detector array supported by said platform and positioned relative to said deflecting means to intercept rays of radiation deflected by said deflecting means; and
a spiral scanner supported by said platform, the spiral scanner positioning and driving said deflecting means to scan said radiation towards said hexagonal detector array in a spiral scan.

16. The system of claim 15 including receiving means synchronized to said spiral scanner and connecting with detectors in said hexagonal detector array for correlating radiation received by the detectors with the position of said deflecting means.

17. In combination:
a plurality of detectors positioned for receiving radiation, said detectors being positioned on the vertices of at least one triangle within the plane of an image provided by radiation;
means for scanning incident radiation about said plurality of detectors;
means coupled to individual ones of said detectors and synchronized with said scanning means for signaling the presence of the path of a point of said image when said point is scanned past said plurality of detectors;
said scanning means including means coupled to said signaling means for varying a path of said scanning; and
means coupled to said signaling means and to said path varying means for controlling said path varying means to provide a repetitive scan pattern when said point of said image passes within a predetermined distance of one of said detectors.

18. In combination:
a plurality of detector elements arranged on an image plane and being spaced apart by distances greater than a diagonal of one of said detector elements;
means for scanning radiation from a distant object past said plurality of detector elements, points of said object imaging on said image plane;
means coupled to said detector elements for directing said scanning means to provide a plurality of paths along which a point of said object is scanned on said image plane, one of said paths intercepting a detector element, and another of said paths passing between neighboring ones of said detector elements; and
said directing means including means for signaling the position of one of said paths relative to at least one of said detector elements, and means responsive to signals of said signaling means for redirecting said scanning means to scan said point of said object sequentially on different ones of said scanning paths to bring the image point from a path between neighboring ones of said detector elements to a path contiguous to at least one of said detector elements.

* * * * *